United States Patent
Estrada et al.

(10) Patent No.: US 9,137,383 B2
(45) Date of Patent: Sep. 15, 2015

(54) SYSTEMS, APPARATUS, AND METHODS FOR COLLABORATIVE AND DISTRIBUTED EMERGENCY MULTIMEDIA DATA MANAGEMENT

(75) Inventors: Lorenzo Javier Estrada, Murrieta, CA (US); Ameel Kamboh, Murrieta, CA (US); Jason Wellonen, Temecula, CA (US)

(73) Assignee: Airbus DS Communications, Inc., Temecula, CA (US)

( * ) Notice: Subject to any disclaimer, the term of this patent is extended or adjusted under 35 U.S.C. 154(b) by 0 days.

(21) Appl. No.: 13/526,305

(22) Filed: Jun. 18, 2012

(65) Prior Publication Data
US 2012/0320912 A1    Dec. 20, 2012

Related U.S. Application Data

(60) Provisional application No. 61/498,478, filed on Jun. 17, 2011.

(51) Int. Cl.
*H04L 12/56* (2006.01)
*H04M 11/04* (2006.01)
*H04W 4/08* (2009.01)
(Continued)

(52) U.S. Cl.
CPC ............ *H04M 11/04* (2013.01); *H04L 67/146* (2013.01); *H04W 4/08* (2013.01); *H04L 67/30* (2013.01); *H04M 3/5116* (2013.01); *H04W 4/22* (2013.01)

(58) Field of Classification Search
CPC ............ B41M 5/38207; Y10S 430/136; Y10S 430/165; H04L 67/146; H04L 67/30
See application file for complete search history.

(56) References Cited

U.S. PATENT DOCUMENTS 2,292,222 A    8/1942    Haigis
3,881,060 A    4/1975    Connell et al.
(Continued)

FOREIGN PATENT DOCUMENTS

CN    102 611 809    7/2012
EP    1148754 A2    10/2001
WO    WO 2009/137019    11/2009

OTHER PUBLICATIONS

"3rd Generation Partnership Project; Technical Specification Group Services and System Aspects; Policy and charging control architecture (Release 11)." 3GPP Standard; 3GPP TS 23.203, 3rd Generation Partnership Project (3GPP), Mobile Competence Centre; 650; Route Des Lucioles; F-06921 Sophia-Antipolis Cedex; France; No. V11.1.0, Mar. 17, 2011, pp. 1-136.
(Continued)

*Primary Examiner* — Charles C Jiang
*Assistant Examiner* — Thad Defauw
(74) *Attorney, Agent, or Firm* — Knobbe Martens Olson & Bear LLP

(57) ABSTRACT

Systems, apparatus, and methods for collaborative and distributed emergency multimedia data management are described. In one aspect, a system includes a packet data reception interface. The system further includes a rules engine coupled with the packet data reception interface and configured to select a processing profile for packet data received, the rules engine further configured to associate packet data received with stored packet data. The system also includes a policy engine coupled with the rules engine and configured to execute the processing profile for packet data received.

24 Claims, 19 Drawing Sheets

(51) Int. Cl.
H04M 3/51 (2006.01)
H04W 4/22 (2009.01)
H04L 29/08 (2006.01)

(56) References Cited

U.S. PATENT DOCUMENTS

| | | | |
|---|---|---|---|
| 5,161,180 A | 11/1992 | Chavous | |
| 5,239,570 A | 8/1993 | Koster et al. | |
| 5,347,568 A | 9/1994 | Moody et al. | |
| 5,388,147 A | 2/1995 | Grimes | |
| 5,479,482 A | 12/1995 | Grimes | |
| 5,646,987 A | 7/1997 | Gerber et al. | |
| 5,937,053 A | 8/1999 | Lee et al. | |
| 6,049,718 A | 4/2000 | Stewart | |
| 6,061,561 A | 5/2000 | Alanara et al. | |
| 6,075,783 A | 6/2000 | Volt | |
| 6,091,808 A | 7/2000 | Wood et al. | |
| 6,128,481 A | 10/2000 | Houde et al. | |
| 6,208,986 B1 | 3/2001 | Schneck et al. | |
| 6,427,001 B1 | 7/2002 | Contractor et al. | |
| 6,442,391 B1 | 8/2002 | Johansson et al. | |
| 6,529,722 B1 | 3/2003 | Heinrich et al. | |
| 6,600,812 B1* | 7/2003 | Gentillin et al. | 379/45 |
| 6,609,213 B1 | 8/2003 | Nguyen et al. | |
| 6,671,350 B1 | 12/2003 | Oxley | |
| 6,671,513 B1 | 12/2003 | Frank et al. | |
| 6,687,251 B1 | 2/2004 | Mousseau et al. | |
| 6,744,858 B1 | 6/2004 | Ryan et al. | |
| 6,771,742 B2 | 8/2004 | McCalmont et al. | |
| 6,801,129 B2 | 10/2004 | Grimm | |
| 6,936,557 B2 | 8/2005 | Park | |
| 6,940,846 B1 | 9/2005 | Frey et al. | |
| 6,940,950 B2 | 9/2005 | Dickinson et al. | |
| 7,027,564 B2 | 4/2006 | James | |
| 7,042,985 B1 | 5/2006 | Wright | |
| 7,054,611 B2 | 5/2006 | Eisner et al. | |
| 7,103,153 B2 | 9/2006 | Stumer et al. | |
| 7,113,795 B2 | 9/2006 | Somani et al. | |
| 7,151,939 B2 | 12/2006 | Sheynblat | |
| 7,174,171 B2 | 2/2007 | Jones | |
| 7,177,651 B1 | 2/2007 | Almassy | |
| 7,194,249 B2 | 3/2007 | Phillips et al. | |
| 7,215,638 B1 | 5/2007 | Roberts et al. | |
| 7,251,312 B2 | 7/2007 | D'evelyn et al. | |
| 7,302,254 B2 | 11/2007 | Valloppillil | |
| 7,330,464 B2 | 2/2008 | Brouwer et al. | |
| 7,333,480 B1 | 2/2008 | Clarke et al. | |
| 7,366,157 B1 | 4/2008 | Valentine et al. | |
| 7,394,423 B2 | 7/2008 | Martino | |
| 7,395,045 B2 | 7/2008 | Jijina et al. | |
| 7,400,876 B2 | 7/2008 | Freilich | |
| 7,505,757 B2 | 3/2009 | Rowitch et al. | |
| 7,545,263 B2 | 6/2009 | Plocher et al. | |
| 7,623,447 B1 | 11/2009 | Faccin et al. | |
| 7,629,882 B2 | 12/2009 | Farah et al. | |
| 7,646,854 B2 | 1/2010 | Anderson | |
| 7,701,363 B1 | 4/2010 | Zlojutro | |
| 7,705,775 B2 | 4/2010 | Madhavan et al. | |
| 7,734,021 B1 | 6/2010 | Croak et al. | |
| 7,813,335 B2 | 10/2010 | Terpstra et al. | |
| 7,839,982 B2 | 11/2010 | Dalrymple et al. | |
| 7,873,366 B2 | 1/2011 | Chen | |
| 7,937,067 B2 | 5/2011 | Maier et al. | |
| 8,059,631 B2 | 11/2011 | Anto Emmanuel | |
| 8,090,357 B2 | 1/2012 | Steel | |
| 8,094,786 B2 | 1/2012 | Ilan et al. | |
| 8,150,363 B2 | 4/2012 | Dickinson et al. | |
| 8,314,683 B2 | 11/2012 | Pfeffer | |
| 8,565,384 B2 | 10/2013 | Schulzrinne et al. | |
| 8,787,872 B2 | 7/2014 | Poremba | |
| 8,848,877 B2 | 9/2014 | Seidberg et al. | |
| 2001/0021646 A1 | 9/2001 | Antonuccii et al. | |
| 2002/0035605 A1 | 3/2002 | McDowell et al. | |
| 2002/0057764 A1 | 5/2002 | Salvucci et al. | |
| 2002/0085538 A1 | 7/2002 | Leung | |
| 2002/0101860 A1 | 8/2002 | Thornton et al. | |
| 2002/0103622 A1 | 8/2002 | Burge | |
| 2002/0118796 A1 | 8/2002 | Menard et al. | |
| 2003/0028536 A1 | 2/2003 | Singh et al. | |
| 2003/0086539 A1 | 5/2003 | McCalmont et al. | |
| 2003/0109245 A1 | 6/2003 | McCalmont et al. | |
| 2003/0139193 A1 | 7/2003 | Buckley | |
| 2003/0148757 A1 | 8/2003 | Meer | |
| 2003/0186709 A1 | 10/2003 | Rhodes et al. | |
| 2004/0023670 A1 | 2/2004 | Merheb | |
| 2004/0033803 A1 | 2/2004 | Varonen et al. | |
| 2004/0049573 A1 | 3/2004 | Olmstead et al. | |
| 2004/0072583 A1 | 4/2004 | Weng | |
| 2004/0152441 A1 | 8/2004 | Wong | |
| 2005/0003797 A1 | 1/2005 | Baldwin | |
| 2005/0043042 A1 | 2/2005 | Hwang et al. | |
| 2005/0083923 A1 | 4/2005 | Kimata et al. | |
| 2005/0085239 A1 | 4/2005 | Cedervall | |
| 2005/0157707 A1 | 7/2005 | Sternagle | |
| 2005/0203892 A1 | 9/2005 | Wesley et al. | |
| 2005/0213716 A1 | 9/2005 | Zhu et al. | |
| 2006/0059232 A1 | 3/2006 | Yoshikawa | |
| 2006/0120373 A1* | 6/2006 | O'Keeffe et al. | 370/392 |
| 2006/0120517 A1 | 6/2006 | Moon et al. | |
| 2007/0003024 A1 | 1/2007 | Olivier et al. | |
| 2007/0041513 A1 | 2/2007 | Gende | |
| 2007/0043726 A1 | 2/2007 | Chan et al. | |
| 2007/0070980 A1 | 3/2007 | Phelps et al. | |
| 2007/0081635 A1 | 4/2007 | Croak et al. | |
| 2007/0103288 A1 | 5/2007 | Herard | |
| 2007/0103294 A1 | 5/2007 | Bonecutter et al. | |
| 2007/0140439 A1 | 6/2007 | Olrik et al. | |
| 2007/0149208 A1 | 6/2007 | Syrbe et al. | |
| 2007/0162228 A1 | 7/2007 | Mitchell | |
| 2007/0190968 A1 | 8/2007 | Dickinson et al. | |
| 2007/0210910 A1* | 9/2007 | Norstrom et al. | 340/506 |
| 2007/0263611 A1 | 11/2007 | Mitchell | |
| 2007/0280430 A1 | 12/2007 | He | |
| 2008/0020781 A1 | 1/2008 | Cho | |
| 2008/0043932 A1 | 2/2008 | Elliott et al. | |
| 2008/0056244 A1 | 3/2008 | Terpstra et al. | |
| 2008/0080525 A1 | 4/2008 | Chatilov et al. | |
| 2008/0186955 A1 | 8/2008 | Puckett | |
| 2008/0253535 A1 | 10/2008 | Sherry et al. | |
| 2008/0273670 A1 | 11/2008 | Dickinson | |
| 2009/0054029 A1* | 2/2009 | Hogberg et al. | 455/404.2 |
| 2009/0157419 A1* | 6/2009 | Bursey | 705/1 |
| 2009/0191841 A1 | 7/2009 | Edge et al. | |
| 2009/0280770 A1 | 11/2009 | Mahendran | |
| 2009/0291663 A1 | 11/2009 | Schultz et al. | |
| 2010/0142386 A1 | 6/2010 | Snapp et al. | |
| 2010/0145861 A1 | 6/2010 | Law et al. | |
| 2010/0198985 A1 | 8/2010 | Kanevsky et al. | |
| 2010/0202368 A1 | 8/2010 | Hans | |
| 2010/0246780 A1 | 9/2010 | Bakker et al. | |
| 2011/0064205 A1 | 3/2011 | Boni et al. | |
| 2011/0110364 A1 | 5/2011 | Fried et al. | |
| 2011/0134897 A1 | 6/2011 | Montemurro et al. | |
| 2011/0173282 A1* | 7/2011 | Aaltonen et al. | 709/206 |
| 2012/0015623 A1 | 1/2012 | Bakker et al. | |
| 2012/0166866 A1 | 6/2012 | Rao et al. | |
| 2012/0307989 A1 | 12/2012 | Hawley et al. | |
| 2012/0320912 A1 | 12/2012 | Estrada et al. | |
| 2014/0187192 A1* | 7/2014 | Keller et al. | 455/404.1 |

OTHER PUBLICATIONS

Balbas et al. "Policy and Charging Control in the Evolved Packet System." IEEE Communications Magazine, IEEE Service Center, Piscataway, US. 47(2):68-74 (2009).

Cassidian: "Aurora: Management Information System for Next Generation 911 Solutions." Retrieved from the Internet: URL:http://www.cassidian communications.com/911-call-processing/911-public-safety.php [retrieved on Sep. 14, 2012].

Invitation to Pay Additional Fees for International Application No. PCT/US2012/042995 dated Sep. 26, 2012.

Natarajan S et al. "Distributed visual analytics for collaborative emergency response management." Proceedings of the 31$^{st}$ Annual

(56) References Cited

OTHER PUBLICATIONS

International Conference of the IEEE Engineering in Medicine and Biology Society: Engineering the Future of Biomedicine, EMBC 2009, Sep. 3, 2009, pp. 1714-1717.

International Search Report for International Application No. PCT/US2012/042995 dated Jan. 23, 2013.

Mintz-Habib M. et al. "A VoIP emergency services architecture and prototype." Computer Communications and Networks. 2005. ICCCN 2005. Proceedings. 14th International Conference. San Diego, CA, USA. Oct. 17-19, 2005. Piscataway, NJ, USA. pp. 523-528.

The Avaya Aura ESRP updated brochure SVC5306. http://www.avaya.com/uk/resource/assets/brochures/Avaya%20Aura%20ESRP%20updated%20brochure%20SVC5306.pdf. Jun. 2010.

International Search Report for International Application No. PCT/US13/65640 dated Apr. 29, 2014.

Schulzrinne et al. The Internet Engineering Task Force RFC5012 entitled "Requirements for Emergency Context Resolution with Internet Technologies" published in Jan. 2008. http://www.ietf.org/rfc/rfc5012.txt.

International Search Report for International Application No. PCT/US2014/057015 dated Dec. 9, 2014.

47 C.F.R. § 20.18 (d)(1) (1996).

Cerulean Software Upgrade Provides Public Safety Agencies with Cost Effective Wireless Data Solution, Wireless Data News, 6:16; (Aug. 5, 1998).

Department of energy improves emergency communication management with SeNTinel WebEOC from CML emergency services inc., PR Newswire (Aug. 3, 2000).

Dexa 2001, LNCS 2113, pp. 557-566 (2001).

Intelligent Transportation Systems—U.S. Dept. Of Trans., "Next Generation 9-1-1 (NG9-1-1) System Initiative—Concept of Operations," (Apr. 2007).

Intelligent Transportation Systems—U.S. Dept. Of Trans., "Next Generation 9-1-1 (NG9-1-1) System Initiative—Proof of Concept Deployment Plan," (2007).

Jackson, Donny. Its time to share, Mobile Radio Technology 23.12, p. 26 (Dec. 2005).

Joint Standard, Enhanced Wireless 9-1-1 Phase 2, J-STD-036-A (Telecomm. Indus. Ass'n 2002).

Krishnamurthy, Nandini. "Using SMS to deliver location-based services." Dec. 2002 IEEE International Conference on Personal Wireless Communications.

Lorello, Tim. Bridging the gap between first responder and citizen caller, Law Enforcement Technology 33.11, pp. 76,78-81 (Nov. 2006).

Meyer et al., Wireless Enhanced 9-1-1 Service—Making It a Reality, Bell Labs Technical Journal, 188-202.

A National Assessment of Police Command, Control, and Communications Systems, U.S. Department of Justice: National Institute of Justice (Jan. 1983).

NENA-04-001 Issue 2, Recommended Generic Standards for E9-1-1 PSAP Intelligent Workstations (Aug. 23, 2000).

NENA-04-004 Original, Recommended Generic Standards for E9-1-1 PSAP Intelligent Workstations (Jun. 16, 2000).

NENA, "NENA Functional and Interface Standards for Next Generation 9-1-1 Version 1.0 (i3)," NENA 08-002, v. 1 (Dec. 18, 2007).

NENA, "NENA i3 Technical Requirements Document," NENA 08-751 (Sep. 28, 2006).

NENA Standard for the Implementation of the Wireless Emergency Service Protocol E2 Interface, Original, Archived, Nat'l Emergency No. Ass'n (Dec. 2, 2003).

NENA Standards Document: NENA Recommended ALEC Service Initiation Standards, Nat'l Emergency No. Ass'n (Feb. 2003).

NENA Technical Information Document on the Interface between the E9-1-1 Service Provider's Network and the Internet Protocol (IP) PSAP Draft Feb. 2003.

NENA Technical Information Document on Future 9-1-1 Models Issue 9, Nat'l Emergency No. Ass'n (Jul. 11, 2003).

NENA Technical Information Document on Network Interfaces for E9-1-1 and Emerging Technologies (Original), Nat'l Emergency No. Ass'n (2002).

NENA Technical Information Document: NENA Review of Non-Traditional Communications to E9-1-1 PSAP Equipment, Nat'l Emergency No. Ass'n (Mar. 20, 2001).

NENA Technical Information Document: SS7 Guidelines for MSC to Selective Router Connectivity (Nat'l Emergency No. Ass'n. 2002).

NENA Technical Information Document: Trunking for Private Switch 9-1-1 Service, Nat'l Emergency No. Ass'n (Apr. 11, 2003).

NENA Technical Reference: NENA Generic Standards for E9-1-1 PSAP Equipment, Nat'l Emergency No. Ass'n (Jun. 20, 1996).

NENA Interim VoIP Architecture for Enhanced 9-1-1 Services (i2). NENA 08-001, Issue 1 (Dec. 6, 2005).

New World Systems Help Downey, CA Police Department meet wireless E911 phase II requirements, PR Newswire Association (Jan. 13, 2004).

Nortel Networks Delivers Efficient Optical Solutions for More Effective Local Governments, Business Wire (Oct. 20, 2004).

Panossian and Medhi, Towards Providing Enhanced 911 Emergency Service in Telephony, Department of Computer Networking, University of Missouri-Kansas City (Nov. 1998, Revised Aug. 1999).

Polyzois et al. From POTS to PANS: A Commentary on the Evolution to Internet Telephony, IEEE Network (May/Jun. 1999).

Proietti, Mario. Carrier Choices in Location: The System Integrator's View, GPS World (Mar. 2002).

Rao et al., iGSM: VoIP Service for Mobile Networks, IEEE Communications Magazine (Apr. 2000).

Revision of the Commission's Rules to Ensure Compatibility with Enhanced 911 Emergency Calling Systems, 11 FCC Rcd, No. 33, 18676-18764 (Jul. 26, 1996).

Revision of the Commission's Rules to Ensure Compatibility with Enhanced 911 Emergency Calling Systems, 9 FCC Rcd, No. 22, 6170-6198 (Oct. 19, 1994).

Rosenberg, et al., "SIP: Session Initiation Protocol," RFC3261, The Internet Society (Jun. 2002).

Ruh et al., "Enterprise Application Integration: A Wiley Tech Brief," John Wiley & Sons, Inc. (2001) 54.

Schulzrinne and Marshall, "Requirements for Emergency Context Resolution with Internet Technologies," The internet Society (Oct. 21, 2005).

Shenker, Scott. Fundamental Design Issues for the Future Internet, IEEE Journal on Selected Areas in Communications, 13:7 (Sep. 1995).

Search Report for Singapore Application No. 201309215 dated Dec. 22, 2014.

TeleCommunication Systems, Inc., "9-1-1 at TCS" (May 6, 2008).

"The tel URI for Telephone Calls" by Henning Schulzrinne and Antti Vaha-Sipila, Internet Engineering Task Force (Oct. 2002).

TIA Telecommunications Systems Bulletin, IP Telephony Infrastructures—IP Telephony Support for Emergency Calling Services, Telecommunications Industry Association (Mar. 2003).

Vegter, Henry M., Exploitation of Existing Voice Over Internet Protocol Technology for the Navy Application, Naval Postgraduate School (Sep. 2002), available at http://hdl.handle.net/10945/4403.

Vivato Announces Latest Domestic Municipal Deployment with Los Lunas, Mexico; Los Lunas Expects Savings of Nearly 80 Percent Using Vivato's Unique Two-tier Approach to Extended Range Wi-Fi, PR Newswire (Jan. 18, 2005).

White County, Tennessee Successfully Deploys Advanced E-911 Mapping and Viewing System for Emergency Response, Business Wire (Jun. 16, 2003).

U.S. Appl. No. 60/332,630, filed Nov. 5, 2011, McCalmont.

U.S. Appl. No. 61/071,547, filed May 5, 2008, Poremba.

Avaya: Solving the Challenges of E911 Service with Avaya IP Telephony Networks, White Paper (Nov. 2002) Issue 1.1.

(56) References Cited

OTHER PUBLICATIONS

Caddo Parish 9-1-1 web page, http://web.archive.org/web/20051229235244/http://ias.ecc.caddo911.com/ActiveEvents.asp. Dec. 2005.

Encore Networks SignalPath™ 230 Signaling Gateway as described in Emergency 911 in Packet Networks and SignalPath™ 230 Signaling Gateway Datasheet (Jun. 2001).

Henning Schulzrinne & Knarig Arabshian, Providing Emergency Services in Internet Telephony, 6 Internet Computing IEEE, No. 3, 39-47 (May/Jun. 2002).

Henning Schulzrinne, 9-1-1 Calls for Voice-over-IP Ex-Parte Filing for Docket 94-101 (Feb. 28, 2003), available at http://academiccommons.columbia.edu/catalog/ac:109698.

Intelligent Transportation Systems—U.S. Dept. Of Trans, "Next Generation 9-1-1 (NG9-1-1) System Initiative—Proof of Concept Testing Report," (Sep. 17, 2008).

Kim, et al., "An Enhanced VoIP Emergency Services Prototype," Proceedings of the 3rd International ISCRAM Conference (B. Van de Walle and M. Turoff, eds.), Newark, NJ (USA), May 2006.

NENA Standard for the Implementation of the Wireless Emergency Service Protocol E2 Interface Feb. 9, 2003: Draft for Final Approval (Nat'l Emergency No. Ass'n. 2003).

* cited by examiner

SYSTEMS, APPARATUS, AND METHODS FOR COLLABORATIVE AND DISTRIBUTED EMERGENCY MULTIMEDIA DATA MANAGEMENT

CROSS-REFERENCE TO RELATED APPLICATIONS

The present application is a non-provisional application for and claims a priority benefit to U.S. Application No. 61/498,478 filed Jun. 17, 2011 entitled "Systems, Apparatus, and Methods for Collaborative and Distributed Emergency Multimedia Data Management," the entirety of which is hereby incorporated by reference.

BACKGROUND

1. Field

The present application is related to management of emergency multimedia data and, more specifically, systems, apparatus, and methods for collaborative and distributed emergency multimedia data management.

2. Background

Emergency response systems may feature very limited capabilities. The emergency system in the U.S., for example, was designed and built several years ago. This system allowed people to place an emergency voice call over a circuit switched network. The system routed the call to an appropriate call center geographically capable of initiating a response to the emergency. To determine the geographic location of a caller, various third party systems were introduced to, for example, provide a look-up service based on the originating phone number. Similarly, an identity system was introduced to provide a number look-up service for the originating communication.

Once the information was dispatched to a call center, the capabilities of the receiving agent were limited. The circuit switched nature of the call limited the ability of an agent to transfer or conference an active call to other entities. Furthermore, transmitting data generated during the call was often decoupled from the call itself. No reliable way was available to reconstruct the events of a given call, let alone several calls related to a similar incident. Additionally, the interfaces were essentially all-or-nothing interfaces in the sense that because of the tight integration with the circuit switch voice systems, entire applications may include features that may not be applicable to all agents. This affected the installation and cost of maintaining call center systems.

To the extent call centers were integrated with other systems, the interface was cumbersome. As previously mentioned, the user interfaces were generally tightly integrated with the circuit switched voice system. Sharing data from the call center with, for example, other call centers or a centralized dispatch station could be fragmented. There also was limited capability to receive information (e.g., feedback) for a transferred event.

Accordingly, improvements in the management of emergency response data are desirable, particularly, as emergency response systems are migrating from a circuit switched network to a packet switched network. In this packet switched world, it would further be desirable to have a system that can efficiently accept emergency information such as voice, text messages, video messages, streaming video, and email and which can correlate the information in a meaningful way to provide situational awareness to a given input, set of inputs, and overall incident.

SUMMARY

The systems, methods, and devices of the disclosure each have several innovative aspects, no single one of which is solely responsible for the desirable attributes disclosed herein.

In one innovative aspect, a system for collaborative and distributed emergency multimedia data management is provided. The system includes a packet reception interface. The system further includes a rules engine coupled with the packet data reception interface and configured to select a processing profile for packet data received, the rules engine further configured to associate packet data received with stored packet data. The system also includes a policy engine coupled with the rules engine and configured to execute the processing profile for packet data received. In some implementations, the system also includes a networked data store coupled with the policy engine. In some implementations, the system may further include an event manager coupled with the policy engine. The event manager may be configured to transmit and receive messages in accordance with a processing profile.

In another innovative aspect, a method for collaborative and distributed emergency multimedia event management among a plurality of agents is provided. The method includes assigning the event to one or more sessions associated with at least one of the plurality of agents. The method further includes assigning the one or more sessions into a session group associated with one of the plurality of agents. The method also includes assigning the session group to an incident.

In some implementations, assigning the event may include identifying a value included in the event. The value may include, for example, a header value or a content value. The value may indicate at least one of a packet content type, a packet content length, a packet source, and a packet destination. In some implementations, assigning the event may include comparing the identified value with one or more values associated with one or more sessions. Comparing the identified value may include generating a comparison value indicating if the identified value is equal to a stored value associated with one or more sessions.

In some implementations, the method may further include identifying one of the plurality of agents as a primary agent for the event.

In yet another innovative aspect, a method for collaborative and distributed emergency multimedia data management is provided. The method includes determining an event type of an incoming emergency multimedia data element. The method also included providing a processing profile for the incoming emergency multimedia data element. The method further includes identifying one or more of a plurality of emergency multimedia data elements based at least in part on a value included in the incoming emergency multimedia data element. The method also includes storing an association of an emergency multimedia data element search result with the incoming emergency multimedia data element.

In some implementations, determining the event type may include identifying at least one of a header value and a content value of the incoming emergency multimedia data element such as, for example, a header value or a content value. The incoming emergency multimedia data may include voice data, video data, text message data, email, image data, geospatial data, and audio data. The identified value may indicate at least one of a packet content type, a packet content length, a packet source, and a packet destination. Providing the processing profile may include identifying a value included in the incoming emergency multimedia data element. Providing the processing profile may also include, in some implementations, comparing the identified value with one or more values associated with a plurality of processing profiles. The comparison may include comparing the identified value with a stored value to generate a comparison value. The result of the comparison may indicate if the values are equal. In some implementations, providing the processing profile may also include selecting a processing profile of the plurality of processing profiles based at least in part on the comparison.

In a further innovative aspect, a computer readable storage medium including instructions for collaborative and distributed emergency multimedia data management is provided. The instructions are executable by a processor of an apparatus. The instructions cause the apparatus to determine an event type of an incoming emergency multimedia data element. The instructions also cause the apparatus to provide a processing profile for the incoming emergency multimedia data element. The instructions further cause the apparatus to identify one or more of a plurality of emergency multimedia data elements based at least in part on a value included in the incoming emergency multimedia data element. The instructions additionally cause the apparatus to store an association of an emergency multimedia data element search result with the incoming emergency multimedia data element.

In an innovative aspect, a computer readable storage medium including instructions for collaborative and distributed emergency multimedia event management among a plurality of agents is provided. The instructions are executable by a processor of an apparatus. The instructions cause the apparatus to assign the event to one or more sessions associated with at least one of the plurality of agents. The instructions also cause the apparatus to assign the one or more sessions into a session group associated with one of the plurality of agents. The instructions further cause the apparatus to assign the session group to an incident.

In one or more of the above identified innovative aspects, selecting the processing profile may include identifying a value included in the packet data such as, for example, a header value and/or a content value. In some implementations the identified value may indicate at least one of a packet content type, a packet content length, a packet source, and a packet destination. The selecting process may include comparing the identified value with one or more values associated with a plurality of processing profiles. The selecting process may include selecting a processing profile of the plurality of processing profiles based at least in part on the comparison.

In one or more of the above identified innovative aspects, comparing the identified value with one or more values associated with a plurality of processing profiles may include generating a comparison value indicating if the identified value is equal to a stored value associated with a processing profile.

In one or more of the above identified innovative aspects, associating packet data received with stored packet data may include identifying a value included in the packet data such as, for example, a header value and/or a content value. In some implementations the identified value may indicate at least one of a packet content type, a packet content length, a packet source, and a packet destination. The association may also include comparing the identified value with one or more values associated with stored packet data. The association may be based at least in part on the comparison.

In one or more of the above identified innovative aspects, the packet data interface may be configured to receive at least one of voice data, video data, text message data, email, image data, geospatial data, and audio data.

DETAILED DESCRIPTION

Figure 1:
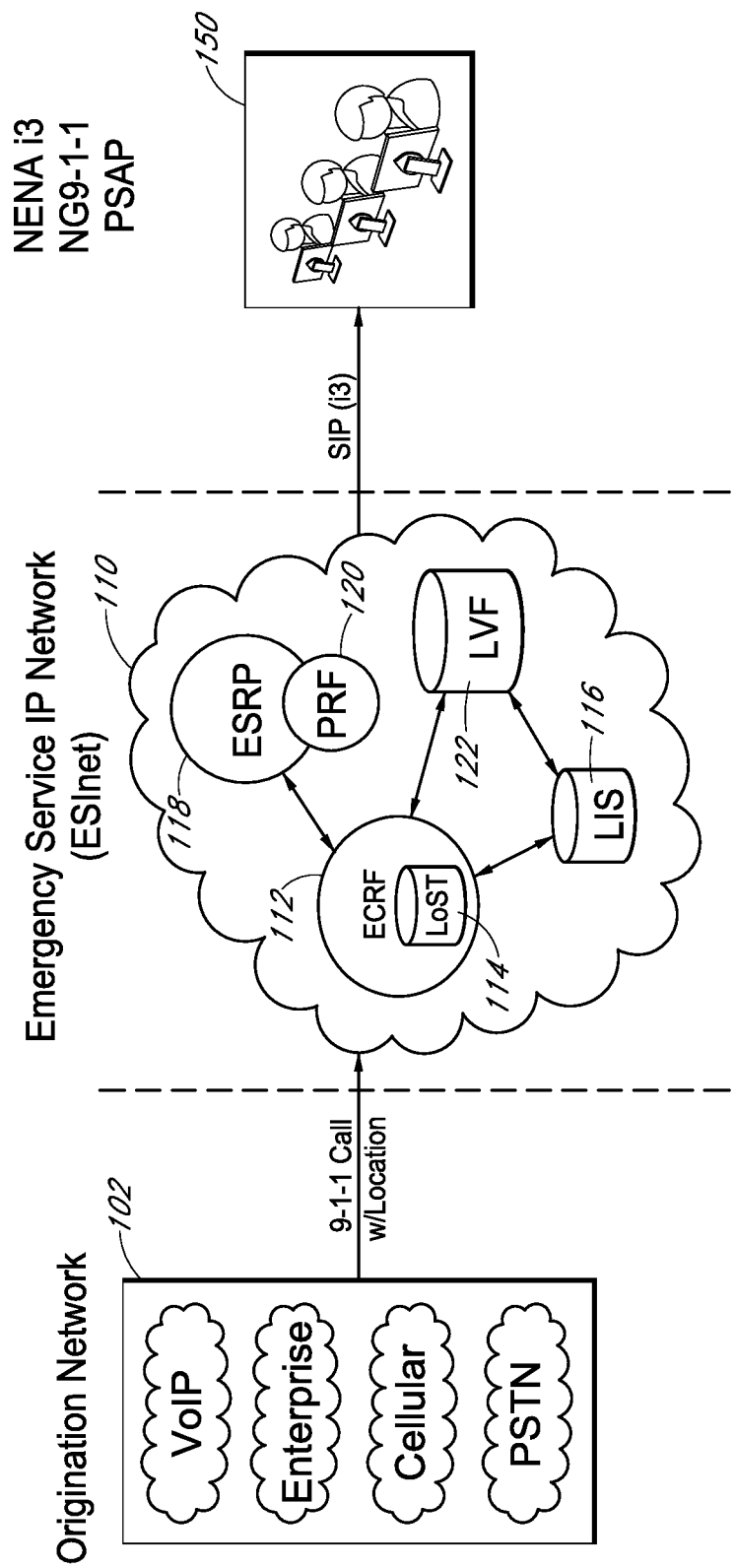
FIG. 1 is an exemplary network diagram for a packet switched multimedia capable emergency response system.

FIG. 1 is an exemplary network diagram for a packet switched multimedia capable emergency response system. The system includes an origination network 102. The origination network 102 is the location where the emergency multimedia data originates. The initiation of the transfer of information to the system from an origination network 102 is generally referred to as an event. Examples of origination networks 102 such as that shown in FIG. 1 include voice over IP (VoIP) networks, enterprise networks, cellular networks, or public switched telephone network (PSTN). It should be noted that events may be generated from a human user of a device capable of transmitting multimedia data (e.g., cell phone, Smartphone, person computer, tablet computer, email client) or an automated system coupled with the origination network 102. The coupling may be electronic, fiber optic, wireless or a combination thereof. In operation, an emergency call with location data is placed from the origination network 102 to an emergency service IP network (ESInet) 110.

The ESInet 110 can provide, among other functions, routing of the emergency multimedia data to an appropriate public safety answering point (PSAP) 150. For example, one ESInet 110 may be connected to multiple PSAPs. It is desirable to ensure the emergency multimedia data is handled by an appropriate PSAP 150. In one implementation, the ESInet 110 includes an emergency call routing function (ECRF) 112. The emergency call routing function includes a directory 114 of available PSAPs. The emergency call routing function 112 may be configured to determine the appropriate PSAP for incoming communications based, at least in part, on the location of the event. To determine the location, the ESInet 110 shown in the example of FIG. 1 includes a location information store (LIS) 116. The incoming event is received by the emergency service routing proxy (ESRP) 118. The ESRP 118 may be configured to query the LIS 116 for the appropriate location information associated with the event. In some implementations, the ESRP 118 and LIS 116 are coupled with a location validation function (LVF) 122. The LVF 122 can be used to ensure the location for the event is a valid location. Once the ESRP 118 has identified a valid location for the event, the ESRP 118 may be configured to query the ECRF 112 using at least the validated location to determine the appropriate PSAP 150. The ESRP 118 can then route the event to the selected PSAP 150.

Once processed by the ESInet components, the resulting session initiation protocol (SIP) message is transferred via a packet protocol (e.g., NENA I3 Standard, TCP/IP) to the packet capable public safety answering point (PSAP) 150. The SIP message or other packet transferred multimedia emergency message (e.g., via SMTP, HTTP, HTTPS) is then used by the PSAP 150 to initiate an intake and response to the communication received from the origination network 102. Only one PSAP 150 is shown in FIG. 1. In other implementations, more than one PSAP 150 may be in communication with the ESInet. Furthermore, some PSAP 150 implementations treat each event as a discrete occurrence. This may create a situation where subsequent events related to a similar incident are not necessarily identified and routed to an agent who may be most familiar with the case. Each PSAP may include one or more agents capable of responding to the emergence event. In some implementations, the agent is a human. In some implementations, the agent is an automated responder (e.g., voice recognition call service).

Under this data paradigm, the number of data types that can be received at a PSAP are expanded to include more than voice. The increased data may enable a more effective emergency response to a given situation. However, by increasing the possible data types the system can handle and the sources the data may come from, the increased volume of information should be managed so as to make the information useful in an emergency situation and to do so in a timely fashion. Furthermore, various PSAPs either in communication with each other or separated from each other may be concurrently receiving events. In some situations, the events received at two different PSAPs may be related to the same incident. Accordingly, systems and methods for correlating, coordinating, and sharing these multimedia events, such as within and amongst PSAPs, are described below.

By enabling the emergency response system to receive multimedia information, a new paradigm in emergency response becomes possible. Consider the situation whereby a child is abducted. As part of this incident, a frantic parent may place an emergency voice call. Meanwhile, a person at another location may notice a struggling child forced into a car and snap a photo of the license plate with a camera phone. This person may subsequently place a second emergency call. As the abductor races from the scene, he may run through a red light at an intersection a few miles away, prompting a third emergency call. According to an implementation of the disclosed system, all four data points (first call, second call, photo, and third call) may arrive at the system at different times. Being able to quickly correlate these multimedia events as part of the same incident, potentially across PSAPs, could mean the difference between apprehending the abductor and a prolonged missing persons search.

Figure 2:
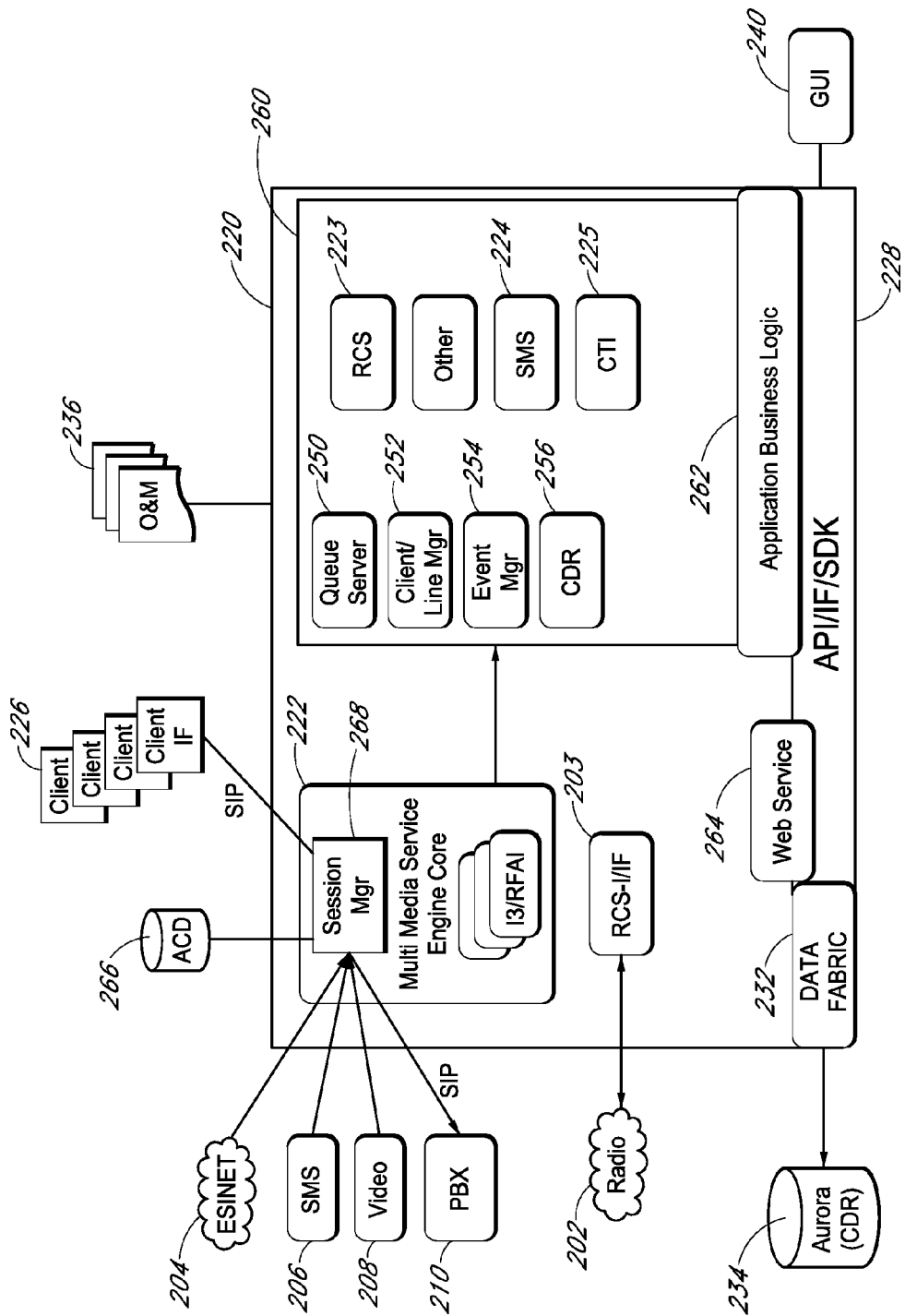
FIG. 2 is a block diagram illustrating one implementation of the disclosed system.

FIG. 2 is a block diagram illustrating one implementation of the disclosed system. The implementation shown includes a radio 202. The radio uses a protocol such as TETRA, P25, or LTE. The radio signal may comprise an input to a multimedia service engine (MMSE) 220. The radio may be configured to receive information from the multimedia service engine 220. Communication to and from the MMSE 220 may include a radio communication service (RCS) interface 203.

The implementation also includes other multimedia sources. In the example shown, emergency service IP network (ESInet) 204, short messaging service (SMS) 206, multimedia messaging service (MMS) 208, packet based exchange (PBX) (e.g., web source) 210, and email (not shown) are multimedia sources. The multimedia sources communicate with the MMSE 220 via packet switched protocols such as HTTP, HTTPS, SMTP, or session initiated protocol (SIP).

In the implementation shown, one or more legacy emergency response systems can also provide input to the MMSE 220. A legacy emergency response system generally communicates with the MMSE 220 via an analog path such as centralized automatic message accounting (CAMA). As shown, the MMSE is configured to process the incoming source data. The MMSE 220 and processing features are described in further detail below. In this example, the MMSE 220 is configured to communicate with one or more agents via a client interface 226. The agents are generally using individual workstations within an emergency response call center, also known as public safety answering point (PSAP). Via the MMSE 220, individual agents may communicate with each other. The MMSE 220 is further configured to communicate with one or more external applications such as a computer aided dispatch system (CAD), geospatial information system (GIS), or call detail record system (CDR). The MMSE 220 is also configured to communicate with one or more other PSAPs. Communication with the external applications or other PSAPs can be via a packet switched protocol (e.g., HTTP) or through a proprietary application programming interface. In some embodiments, this interface is implemented as message based packet interface such as a web service.

The MMSE 220 includes an MMSE core 222 which includes in its responsibilities the correlation and coordination of the multimedia events. The MMSE core 222 may be coupled with an automatic call distribution system 266. The automatic call distribution system 266 may provide information to the MMSE core 222 identifying the appropriate routing for a particular event. For example, a session manager 268 included in the MMSE core 222 may be configured to identify a value associated with an incoming multimedia data element (e.g., location), and query the ACD 266 for information to route the call (e.g., which PSAP, agent, and/or agent workstation). The MMSE core 222 is described in further detail below.

The MMSE 220 may include an application programming interface 228 to allow external applications to communicate with the MMSE 220. For example, a graphical user interface 240 may access the system. In the example shown, an API 228 is configured to allow access to application business logic 262 of the MMSE 220.

The application business logic 262 is configured to mediate communications with business applications 260 included in the MMSE 220 and the API 228. As shown in the example of FIG. 2, the business applications 260 include a radio application (RCS) 223, an SMS application 224, and a computer telephony integration (CTI) application 225. Other application types are contemplated and are discussed in further detail below.

In one example, the API 228 may include a web service interface 264. The web service interface 264 may be configured to receive and transmit signals via a packet protocol such as HTTP or HTTPS. The signals may include event information.

The MMSE 220 may include a data fabric 232 as a data storage means. The data fabric 232 allows the components of the MMSE 220 to easily share information. The data fabric may be configured to allow components outside the MMSE 220 to access information from the MMSE 220 and provide information to the MMSE 220, such as a call data record system 234. The MMSE 220 may be administered at least in part and based upon one or more operations and management profiles 236. These profiles may identify characteristics of the system such as quality of service (e.g., desired number of client connections) or operational characteristics (e.g., applications to be deployed and number instances to deployed).

As an example, the MMSE 220 processes incoming events to the system via a number of interfaces. Each incoming event is tagged with a multimedia type and each type is associated with a set of workflows or business rules. The MMSE 220 is configured to ensure that each step in the workflow is executed and to coordinate the timing of the steps. The business applications 260 of the MMSE 220 may include a queue server 250, a client/line manager 252, an event manager 254, and/or a call data record system 256 to support the execution and coordination process. These and other components are described in further detail below.

The MMSE 220 may be configured to allow nesting workflows where a step in a workflow can execute another workflow. This allows for merging workflows and reusing workflows to compose other workflows. In one implementation, the MMSE 220 includes a configuration utility for building workflow rules and adding them to the system.

Workflows can change dynamically while the system is running. Workflows can be versioned. A versioned workflow may include a rule that specifies which input events are associated with that workflow.

When an event is received by the MMSE 220, the system preprocesses the event and extracts any relevant data from the event for further processing. The event is then executed against workflows configured to execute under the direction of the MMSE 220. These workflows may trigger asynchronous messages to other services to execute the workflow. The MMSE 220 is configured for orchestrating the workflow and coordinating the activities between all the various services involved in a work flow.

In this example, the MMSE 220 is driven based on messages, each of the multimedia input is converted into an event message and passed onto an MMSE input queue. The MMSE 220 can also be configured to process messages from application services as feedback events to continue workflow execution. In one implementation, in progress messages have higher priority than incoming multimedia event messages to ensure continuity of the workflow. The MMSE 220 may be configured to generate a session and a corresponding session group for new input events. Sessions and session groups are discussed in further detail below.

Figure 3:
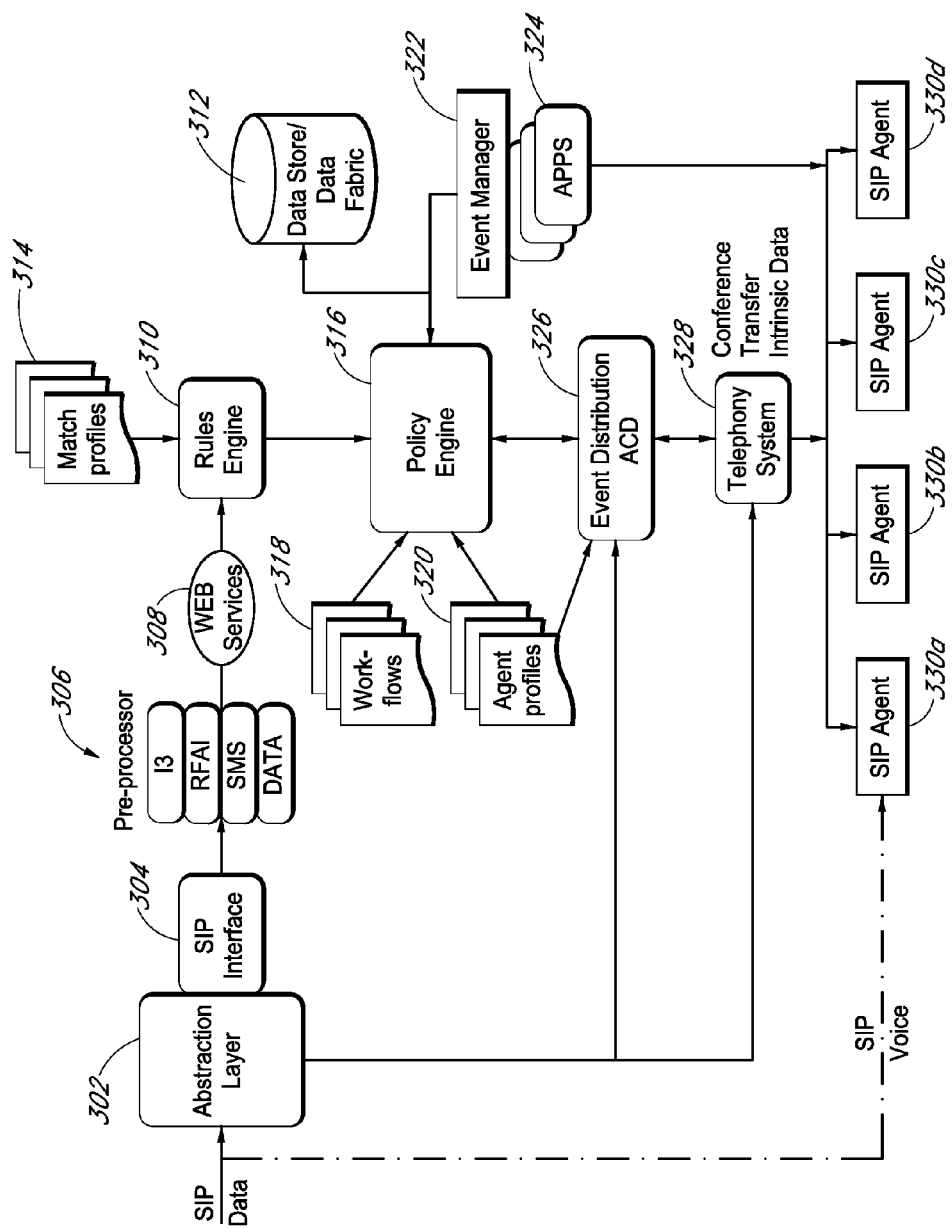
FIG. 3 is a block diagram illustrating an implementation of a multimedia service engine architecture.

FIG. 3 is a block diagram illustrating an implementation of a multimedia service engine architecture. In this embodiment, a packet data event is presented to the system. In the example shown in FIG. 3, the packet data event is a SIP event. As discussed above, other forms of packet data may be presented to the system such as HTTP, HTTPS, or SMTP and handled in a similar fashion as will be described. A SIP event can include two parts: SIP data and SIP voice. The SIP data is received at an abstraction layer 302. The abstraction layer provides a link to a SIP interface 304. The SIP interface 304 is coupled with a pre-processor 306. The pre-processor 306 may include modules for processing information such as packet emergency data (e.g., I3), requests for assistance (e.g., Request for Assistance Interface (RFAI)), SMS, or other data.

While the elements of this figure and others in this application appear in a single diagram, it should be understood that co-location in the diagram does not necessarily imply physical co-location of the elements depicted. As shown, the individual components may be located at the same site and on the same server, or distributed across several sites and different servers.

In the example shown in FIG. 3, a web service 308 is provided as an entry to a MMSE core. The MMSE core may be similar to the MMSE core 222 shown in FIG. 2. Other interfaces such as RPC, direct socket connection may be included concurrently or as alternative interfaces to the MMSE core. The MMSE core includes a rules engine 310. The rules engine 310 is coupled with a match profile repository. For example, the match profiles may be stored in a data store 312. A match profile repository can store one or more match profiles 314. A match profile 314 is a set of attributes the MMSE locates to determine how a given event should be processed. For example, SIP data may include a series of header elements such as time, data source (e.g., phone number), data location, or data type. By parsing one or more header elements and comparing them to match profiles, the rules engine may identify different actions to be taken for the event. In the abduction example, the rule engine may correlate the phone call and the camera phone picture based on the geo-position from which the events were transmitted and a proximity. Matching criteria may also consider temporal proximity to correlate events.

The rules engine 310 may be configured identify match profiles 314 based, at least in part, on the content of an event. For example, a data profile may include a regular expression that, if the event data matches, triggers a certain set of actions. In the abduction scenario, the emergency caller may identify the car as a Ford Focus. The PSAP may receive a subsequent SMS message "Kid forced into ford focus 123 Main Street." Using a content-based matching profile for "ford focus," the two messages may be indentified and correlated as potentially part of the same incident.

As another example, pre-processing for an image event may include a call-out from the MMSE to an image processing service that extracts features from images (e.g., license plates, faces, landmarks) and the rules engine identifies a match profile based at least in part on the features identified through pre-processing. How events are matched is described in more detail below. Match profiles may be statically defined and stored in a data store. For example, a default profile may be defined to specify the basic handling of an event. Match profiles may be dynamically defined during system operation. For example, in the abduction scenario, the license plate number of the suspected abductor's car may serve as a match profile while the hunt is in progress. Accordingly, any event including information that matches the license plate number (e.g., a traffic stop) would trigger a match. Once the situation has ended, this match profile can be removed manually (e.g., by an agent) or automatically (e.g., once the session is inactive) from the system.

The rules engine can also provide coarse grained filtering events. Filtering events provide a way to avoid sending events to an agent that can otherwise be excluded as "noise" or handled in an automated fashion. For example, if a PSAP receives unsolicited commercial email, system resources can be saved if these events are not processed as emergencies. Another example a "noise reduction" filter could be a rule that disregards a faulty alarm that continually triggers, but is in fact a false alarm. Yet another example of filtering is the situation where a major event occurs and a response has already been initiated. In this case, an automated message informing the caller that an appropriate response has been dispatched could reduce the number of calls needing attention by an agent.

The match profile may also include routing information for the event. The MMSE may include several different applications for processing specific types of events. Based at least in part on characteristics of the event (e.g., event type), the rules engine may identify a match profile which lists the appropriate application or applications to handle the event. Specific examples of applications are discussed below.

The rules engine transmits the event data and the application(s) identified in the match profile for this event to a policy engine 316 included in the MMSE core. The policy engine 316 is configured to coordinate the dissemination of the event to the identified applications. The dissemination process may include workflows 318 and/or agent profiles 320 to provide information for transmitting an event to the identified destination(s). The structure and function of the policy engine 316 are described in further detail below.

The policy engine 316 is coupled with a data store 312. As shown in FIG. 3, the data store 312 is a data fabric. A data fabric allows distributed sharing and storage of SIP data and other information collected or generated by the MMSE 220. The data store 312 preferably stores data across many servers. The servers may be replicated or partitioned. In some implementations, the data is cached in local process memory with the overflow written to a permanent storage (e.g., disk). In another implementation, a traditional relational database management system may be the data store.

In one embodiment, the data store is implemented such that information is shared with multiple sites. A data ring allows information to be received from multiple sources and made available to systems connected to the ring. An example of a data ring is shown in Appendix A at page 4.

The policy engine 316 is coupled with an event manager 322. The event manager 322 is coupled with one or more applications (e.g., CAD, GIS) 324. Each application has access to the data store 312. In part under the direction of the policy engine 316, the event manager 322 sends and receives information to and from the applications 322. For example, a voice application may be configured to process voice events. Further details on applications are described below.

The policy engine 316 is further coupled with an event distribution module 326, also known as an automatic call distributor (ACD). The ACD 326 determines which agent should receive a given event. The determination is based at least in part on information received from the policy engine event type, one or more agent profiles 320, or the raw event data. ACD vendors may also provide agent profiles 320 as part of the implementation of the physical transfer mechanism for calls and other event data. The event distribution may be based on some or all of these agent profiles 320.

Agent profiles 320 may include network information about the agent such as the workstation the agent is logged into, the agent's workstation IP address, or contact information for the agent. An agent profile 320 may also include skill set information for agents. For example, certain agents may specialize in handling abduction events and thus the ACD 326 would use some initial information from the SIP data or the policy engine 316 to tag an event as a possible abduction. This tag may be read by the ACD 326 and used to identify agents who may be particularly trained to respond to this type of event. As another example, some agents may speak foreign languages. Accordingly, events identified by a match profile as originating from a foreign language speaker can be routed to an agent most likely to speak the language.

The event may be associated with a priority. Given the priority of a particular event, rather than processing events in the order received, the higher priority event may be processed out of turn ahead of less urgent events. For example it may be desirable to address an emergency call for a fire before a call for a cat stuck in a tree.

The ACD 326 may also be configured to communicate information to the policy engine 316. For example, if the event distribution fails, the ACD 326 may communicate this condition to the policy engine 316. In this example, the policy engine 316 may be configured to process the event according to an alternate workflow and/or generate an alert as to the cause of the failure.

In the example shown in FIG. 3, the ACD 326 is configured to communicate with a telephony system 328. As shown, the SIP interface is configured to transmit SIP data to the telephony system 328. Once the ACD 326 determines the appropriate agent for a given event, the telephony system 328, which is also coupled with the SIP interface, may transfer the event to the appropriate agent (e.g., one or more of 330a, 330b, 330c, and 330d).

When the telephony system ultimately transfers the SIP data to an agent, the SIP data, any information generated by the MMSE 220, and the SIP voice are reunited on a single interface. For example, the SIP data and information generated by the MMSE 220 travel together through the MMSE core 222. Using information in the SIP header, the SIP data and SIP voice components can be correlated for unified presentation at an agent workstation. Alternatively, an event identifier assigned by the policy engine 316 can be used as a reference for this event. Furthermore, because the same data may be transmitted from the MMSE core 222 to different applications, each application may transmit data directly to an agent workstation for unified presentation as the data becomes available. For example, for an application that operates on the data contained in the event, this application may provide the data needed for presentation relatively quickly. A second application for the same event may use a look-up service to acquire additional information. The interface may present the information from the first application along with a pending indicator for the second application. This allows an agent to begin working with the available event data rather than waiting.

For example, in the abduction scenario, the SMS message is likely be transmitted from a phone. Accordingly this event may be routed to two applications, an SMS application, such as the SMS application 224, and a call information application, such as a computer telephony interface application 225 and/or a call data record application 256. The SMS application may be configured to display the message while the call information application is configured to obtain information about the origin of the message based on, for example, the sending device's phone number. An example of an interface and integration with applications is described in further detail below.

In the implementation shown in FIG. 3, because of the bi-directional nature of the coupling between an agent, the telephony system, the event distribution and the policy engine 316, an agent may transfer an event back to the MMSE 220.

For example, if an event is related to another event, it may be desirable to transfer the event back to the policy engine 316 to perform correlation of the two events and re-assign the event to a single agent. This functionality is described in further detail below.

Figure 4:
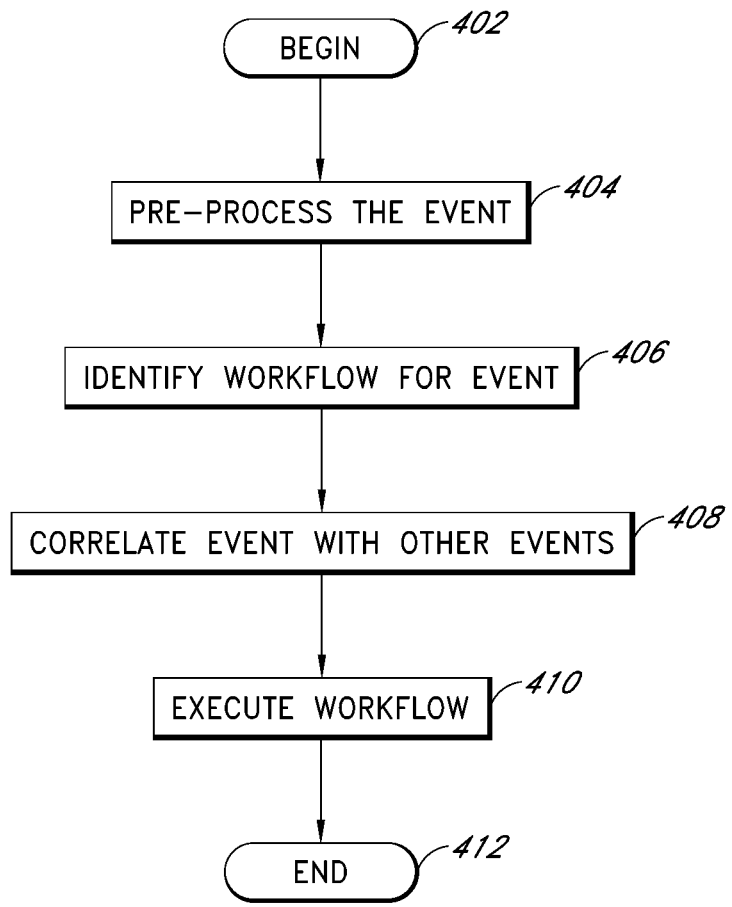
FIG. 4 is a process flow diagram of an example of the operation of a multimedia service engine.

FIG. 4 is a process flow diagram of an example of the operation of a multimedia service engine. The process begins at block 402 with the receipt of a new event. At block 404, the event is pre-processed. The pre-processing step may include extracting the header information or decoding the incoming message. At block 406, a workflow is identified for the event. The workflow dictates how the event should be handed by the MMSE 220. At block 408, the event may be correlated with other events. By searching the shared data store, one or more related events may be identified. The events may be stored in data stores associated with different PSAPs. For example, in the abduction scenario, because the abductor may be changing his physical location, multiple events could be generated for the abduction. By sharing data across PSAPs the events may be searched by all PSAPs as new events occur. At block 410, the workflow is executed. Workflow execution generally includes distributing the event to one or more applications. The workflow may also initiate automatic responses or filtering of the event. At block 412, the flow ends.

Figure 5:
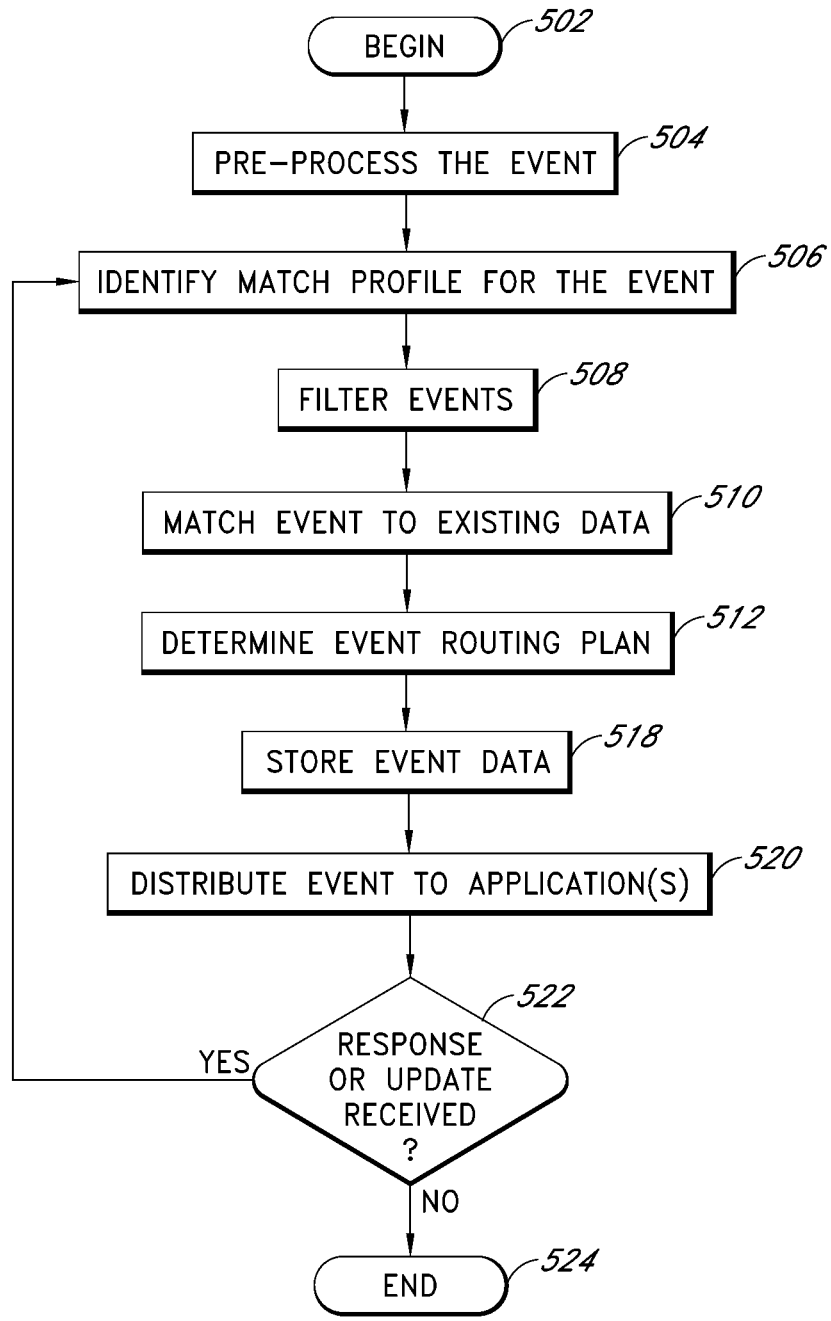
FIG. 5 is a process flow diagram illustrating an exemplary method of handling an event.

FIG. 5 is a process flow diagram illustrating an exemplary method of handling an event. The flow begins at block 502 with the receipt of a new event at the MMSE 220. At block 504, the event is pre-processed. The pre-processing may include determining a type for the event, classifying the event, or decoding an event. The pre-processing may be performed by the SIP Interface Provider. In another implementation, the pre-processing is performed by the MMSE core 222. At block 506, the MMSE core 222 identifies a match profile for the event. At block 508, the event may be filtered as described above. At block 510, the event is compared to existing event data to determine whether other related events have been received. The matching for existing data is described in further detail below. At block 512, the MMSE core 222 determines an event routing plan based on the matching profile. The event routing plan may include the applications to receive the event, the sequence the applications should receive the event, or timing constraints for routing the event. At block 518, the event data may be stored in the data store, such as data store 232. In one implementation, the event routing involves sending an event identifier to the destination applications. In this implementation, the data may be stored with the event identifier as the unique key for the event. Accordingly, the event identifier allows the destination applications to retrieve information about the event, including the event data, to perform further processing for/on the event. The routing plan may be stored in the data store. At block 520, the event is distributed to the applications in accordance with the routing plan.

In some implementations, routing an event to a particular application may generate a response message. In some implementations, the application may generate periodic information messages (e.g., status). These response or update messages may be treated as an event. At block 522, if a response or update message event is received, the flow returns to a block 506 and repeats the event processing for the new event. If no applications transmit a response or update message, the flow ends at block 524.

Figure 6:
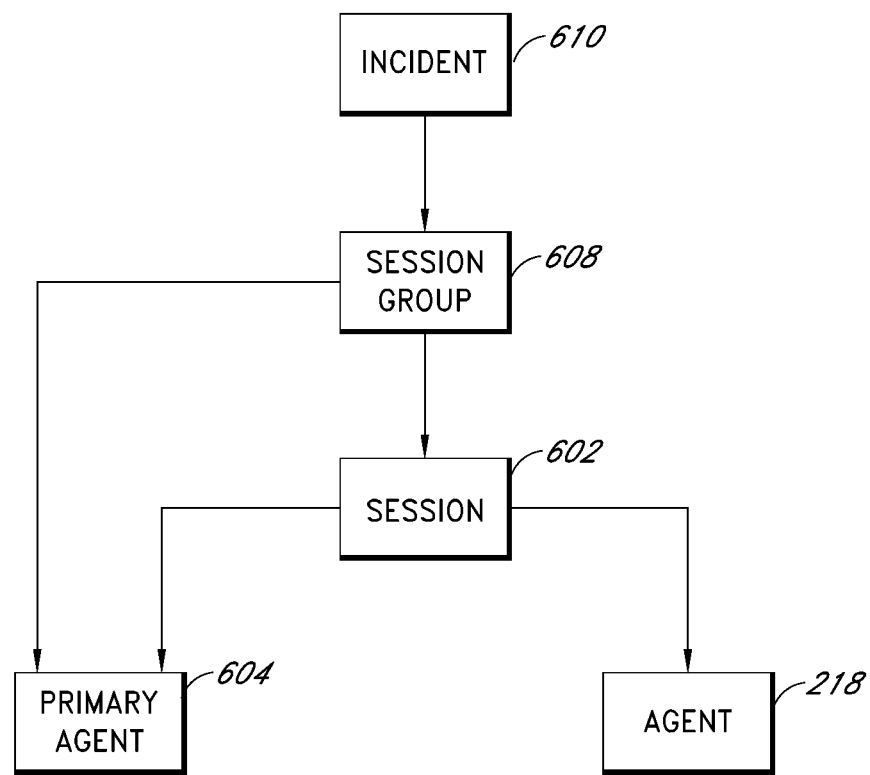
FIG. 6 is an exemplary session data object structure diagram.

FIG. 6 is an exemplary session data object structure diagram. A session 602 data object is the lowest level representation of an event. Each session 602 includes an event identifier uniquely identifying the session for the event. As discussed above, an event generally corresponds to an emergency response event such as an emergency phone call, email, text, or video. However, as discussed above, a single event (e.g., an SMS message) may create multiple sessions (e.g., call session and SMS session). An event may also include system events such as assignment of a work item to a particular agent, a response for an application, transmitting an event to an external system, or agent initiated data entry (e.g., notes taken during a call, a call initiated by an agent). Each session may include a unique session identifier.

Each session has a primary agent 604. The primary agent 604 is the individual identified as the main point of contact for the given event. Generally, the primary agent 604 is the person at the PSAP who is handling the event. A session may also be associated with other agents 606. The other agents 606 may be agents other than the primary agent 604, who may be handling a related event. By creating the association between the agents 606 and the session 602, related events may be grouped and the information pertaining to the shared sessions efficiently managed between the agents and the primary agent. The designation of primary may be transitory. For example, a first agent receiving the initial communication for an event may be designated as the primary agent. Subsequently, a second agent may be identified as the primary agent to consolidate activities related to the event (e.g., the event is related to an previously identified incident assigned to the second agent).

Multiple sessions 602 may be collected into a session group 608. Each session group 608 may include a unique session group identifier. The session group 608 may comprise events simultaneously transmitted (e.g., a photo sent during a mobile phone call), or events later determined to be associated. The events need not necessarily be linked by source, originating device, or time. The event data matching of the policy engine 316 may use these factors in matching events, but these are not the exclusive factors. An external application may create this association. For example, a computer assisted dispatch system may identify two events as related and transmit this information to the MMSE 220. Each session group 608 is associated with a primary agent 604.

Multiple session groups may be associated into an incident 610. The incident 610 may include a unique incident identifier. As with the sessions, the session groups need not necessarily be linked by source, originating device, or time to be categorized as an incident. Agents or external systems may identify multiple session groups as part of an incident.

Using the information associated with the entities shown in FIG. 6, correlations between different entities may be achieved. For example, sessions may be associated with an incident tracking identifier. The sessions associated with the common incident tracking identifier may be related. The incident tracking identifier for a session may be provided at the network level (e.g., I3) or at the PSAP level. At the PSAP level, the system may be configured to transmit information about the PSAP and the call handling to the originating device. This information may include one or more of a PSAP identifier, a PSAP mail identifier, PSAP domain information, and an incident identifier. This information may be used for matching subsequent sessions as described herein. For example, the session information may be transmitted to a device. The device may use the information to transmit additional data regarding the same incident. For example, a 9-1-1 call may initiate a first session. The device may receive one or more of a PSAP identifier, a PSAP mail identifier, PSAP domain information, and an incident identifier. Subsequently, the device may be configured to compose and transmit an email message. As part of the transmission, the device may be configured to include the received PSAP identifier, the PSAP mail identifier, the PSAP domain information, and/or the incident identifier. This may further expedite the association and routing of the information to the agent(s) attending to this incident.

Sessions may be initiated from a device. As such, the device identifier associated with a session may be used to correlate related sessions. Examples of device identifiers include MAC address, mobile subscriber identifier (e.g., international mobile subscriber identity, international mobile equipment identity, mobile equipment identifier), or the like. In some implementations, multiple device identifiers may be identified by a single device group. In such implementations, the correlation may be based on the device group.

Automatic number identification or "from" information associated with the device initiating the session may be used to correlate sessions. Automatic number identification determines information associated with the device such as the telephone number of the originating device. The telephone number may be compared with a telephone number associated with other sessions to correlate the sessions. A caller may also be identified by name (e.g., caller ID). Sessions from a source having a common name may be associated. For example, a first call may be placed from John X. Smith's cellular phone. A second call may be placed from the residence of John X. Smith. As such, these two calls may be related based on a match between the name associated with the first call and the name associated with the second call. When matching names, or the other identified attributes, the system may be configured to perform partial matches (e.g., stem searches, probabilistic matching), phonetic matches, or other approximate matches.

Sessions may be initiated from a source which may be geo-located. For example, a smartphone may include global positioning system capable of transmitting the location of the device. A session may be correlated with another session in an overlapping spatial region. For example, emergency phone calls placed from multiple phones located near the same freeway exit may be related to a similar traffic accident. Other types of sessions may include location information such as a public switched telephone call and the origination IP address of an email or voice over IP call.

These match attributes are provided as examples of attributes which may be used to correlate sessions, session groups, and incidents. The information included in or derivable from a session may be used as a basis to associate the session with others. One non-limiting advantage of a system including match profiles is distributed application logic with the ability to associate session with one another and group sessions intelligently with incidents. By using one or more of the above attributes to intelligently associate sessions into session groups and/or with incidents. The systems and methods described may be configured for processing policy rules to react to incoming events and system events to correlate incident behavior back to the agent.

Figure 7:
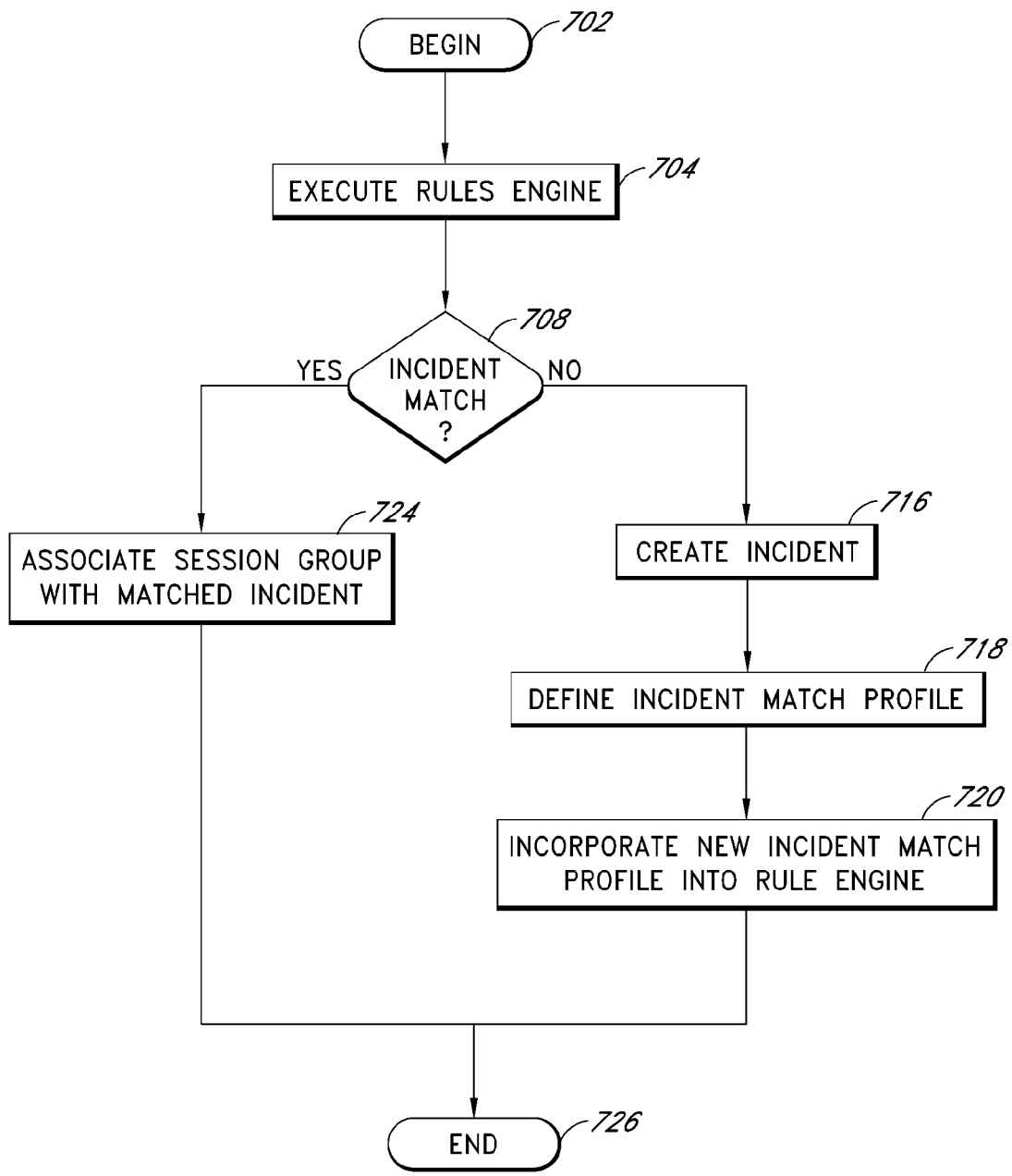
FIG. 7 is a process flow diagram illustrating an exemplary method for associating a session group with an incident.

FIG. 7 is a process flow diagram illustrating an exemplary method for automatically associating a session group with an incident. At block 702, the process begins when at least one session group is identified in the system. It should be understood that this process may be initiated separate and apart from the association of a session with a session group. Provided the system has one session group, this process may be initiated. At block 704, the process executes the rules engine. The rules engine may be configured to continuously poll for new match profiles for sessions and/or session groups. At decision block 708, the process determines whether an incident matches the particular session group. The identification of the active incidents can include identifying session groups from the data store associated only with the PSAP receiving the session. The identification of the active incidents can include identifying incidents from data stores at PSAPs other than the original receiving PSAP. For example, if an inter-county or inter-state event is occurring, emergency information may be received from different locations that would route to different PSAPs. Accordingly, it may be desirable in some implementations to identify incidents from the local PSAP as well as PSAPs for adjacent jurisdictions.

If the event matches an incident match profile, the flow proceeds to a block 724 where the session group is associated with the matched incident. The flow then ends at block 726.

At block 708, if the session group does not match an incident, the flow proceeds to a block 716. At block 716, a new incident is created. At block 718 a new incident match profile may be created. For example, in the abduction scenario, a match profile on the license plate number for the abductor's car may be defined such that any information referencing this vehicle is centrally identified. At block 720, the new incident match profile is registered by the rules engine and will be considered for all subsequent events and/or sessions received by the MMSE. At block 726, the process ends.

Figure 8:
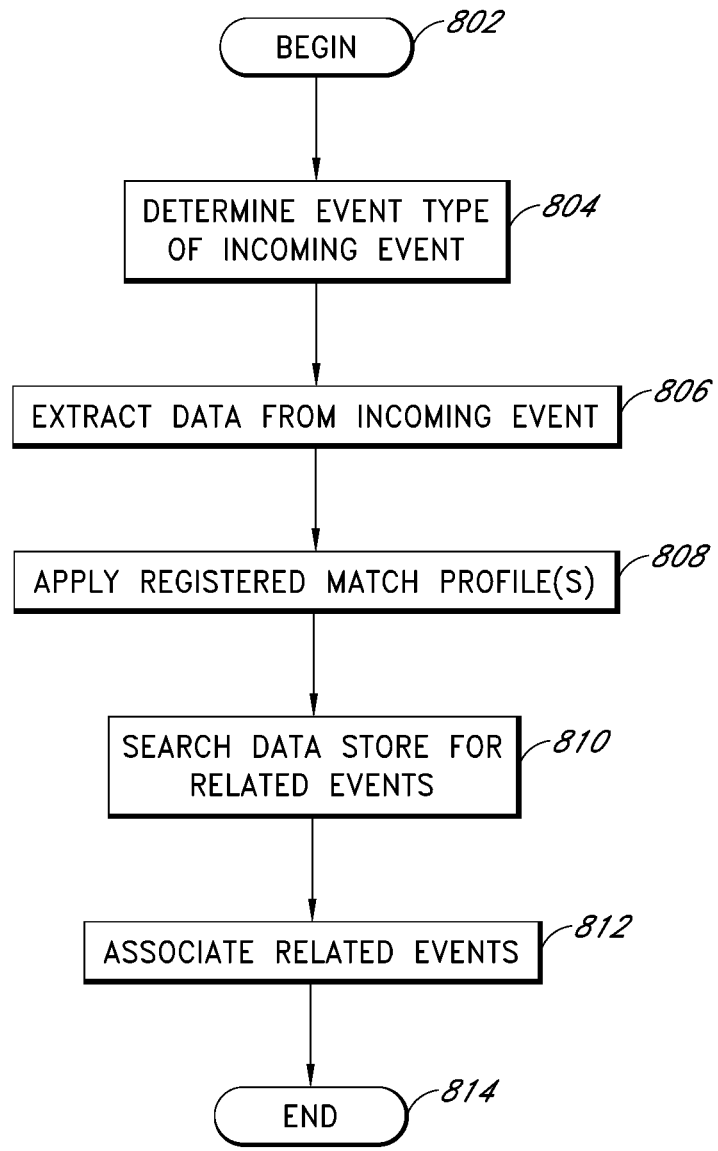
FIG. 8 is a process flow diagram of one method for associating events.

FIG. 8 is a process flow diagram of one method for associating events. The process begins when the MMSE 220 receives a new event at block 802. At block 804, the process determines the event type of the incoming event. At block 806, the process extracts data from the incoming event. Because the event type has been previous identified, the process can efficiently select an appropriate extraction method for the incoming event. For example, the process may read header information from the event such as a location or a name. In the case where the event is an email message, the process may extract message header information such as the sender or the originating IP address or from the message body itself (e.g., the text of the message).

At block 808, the process determines the appropriate match profile for the incoming event. In one implementation the match profile is a list based matching whereby an ordered list of matching criteria is evaluated in sequential order. Once data extracted from the event satisfies a match profile on the list, that profile is used to direct further processing of the event. In another embodiment, multiple match profiles may be identified for an event and executed for example in parallel or in order of priority. The determination can be based, at least in part, on the event type. The match profile may be selected based in part on factors unrelated to the incoming event such as network configuration (e.g., available data sources, PSAPs, external systems), or operational situation (e.g., peak hours, off-peak hours, emergency).

At block 810 the process utilizes, in whole or in part, the extracted data and the match profile to perform a search of the data store for related events. The match profile may specify which data store or data stores to query. Alternatively, the process may be configured to search specific data stores. The data store searched may be local to the PSAP receiving the incoming event. The data store searched may be located at a different PSAP than the PSAP receiving the incoming event. The process receives the results.

At block 812, the received results are used to associate the events matched with the incoming event. In one implementation, the data store is used to persist the relationship between the incoming event and the matched events, for example using the event identifier. If no results are received, the process creates a new session group and associates the incoming event with this new session group. At block 814, the process ends.

In the example of the abduction, the SMS message and initial phone call may both contain location information. A match profile may be defined to correlate events occurring within 500 feet of each other. In this example, the SMS message may be sent from a location near the location where the phone call was placed. Accordingly, these two events would satisfy this match profile and be assigned to the same session group.

Figure 9:
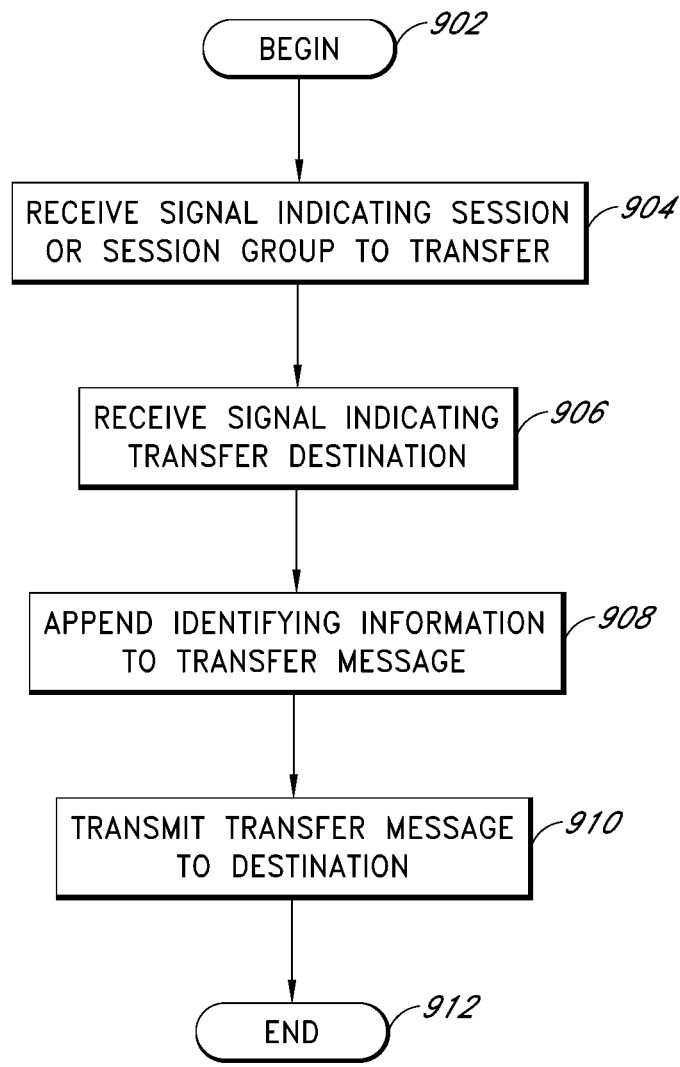
FIG. 9 is a process flow diagram illustrating a method of transferring one or more session event to another agent at a call center, another call center, and an external system.

FIG. 9 is a process flow diagram illustrating a method of transferring a session or session group. While this process describes a transfer (e.g., change control from one entity to another), the process may be used to effect any control operation (e.g., park, release, conference, observe). The process begins at block 902 when a session or session group is activated. In one embodiment, a session or session group is activated when a signal requesting display of the session or session group is transmitted to the system. At block 904, a signal indicating a session or session group to be controlled is received. Accordingly, a single session (e.g., voice, SMS, video) may be transferred alone or an entire session group representing all the sessions related to an event may be transferred together. By transferring session groups, one transaction may be used to send multiple sessions to another agent. The selection may come via a signal received from sources such as a user interface, the MMSE core, or an external system (e.g., CAD). At block 906, the process receives a signal indicating the transfer destination the selected session or session group. The destinations may include available agents, PSAPs, or external systems. In another implementation, the process may automatically determine the destination based on rules.

At block 908, information identifying the session or session group to be transferred is appended to the transfer message. For example, if a session is being transferred via SIP, the session identifier may be appended to the SIP header. As another example, if a session group is being transferred over SMTP, the session group identifier may be appended in an SMTP message header.

At block 910, information including the selected event and the selected transfer destination are transmitted to the destination system. When the transfer message is received by the destination system, the message may be treated as a new event and processed, for example, as described above in FIG. 8. An initial match profile may identify the presence of a session or session group identifier in the header. This match profile may then interrogate the shared data store to retrieve the information for the session or session group using the session or session group identifier. Accordingly, the receiving system benefits from the processing performed by the previous MMSE. At block 912, the process ends.

Figure 10:
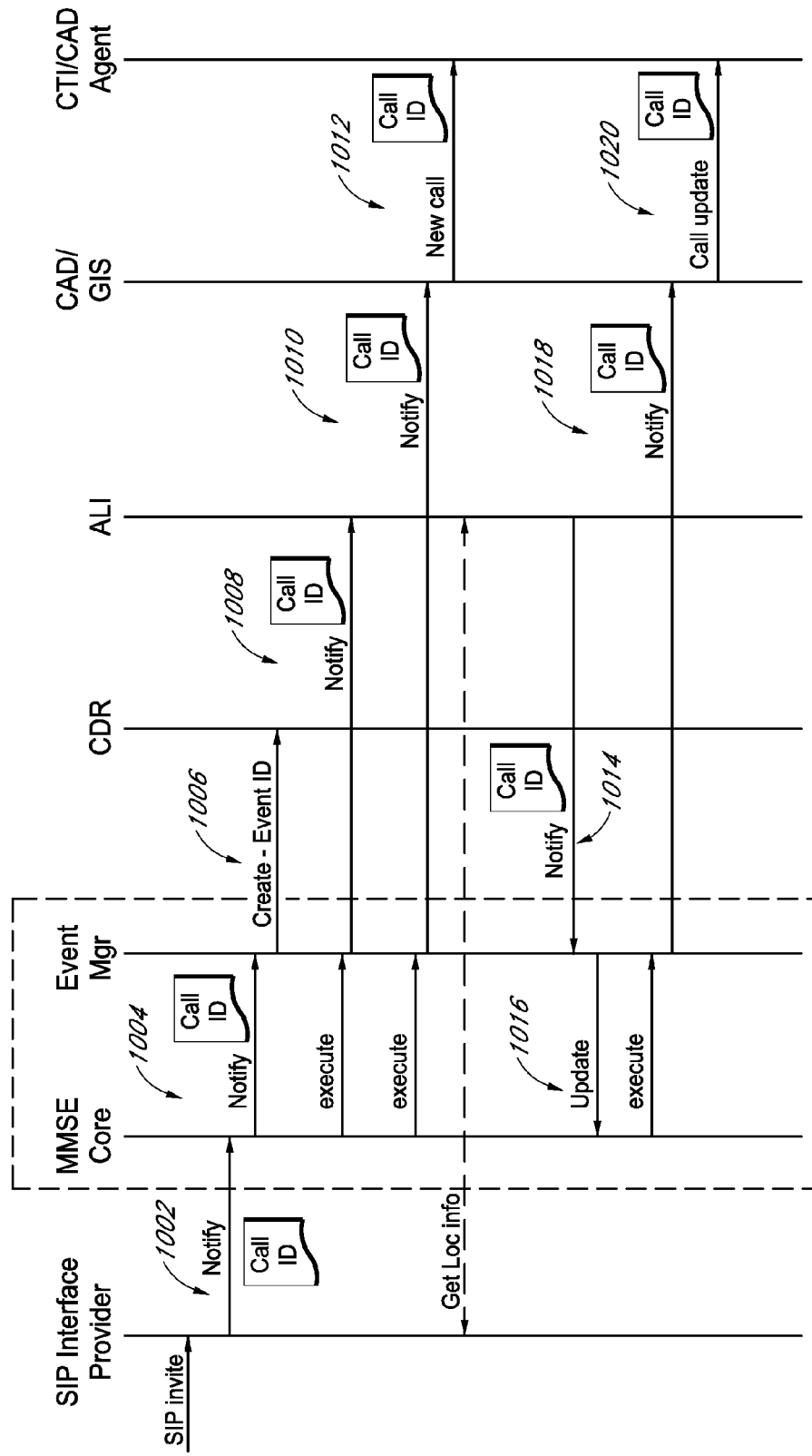
FIG. 10 is an exemplary data flow diagram for an emergency voice call.

FIG. 10 is an exemplary data flow diagram for an emergency voice call. This example further illustrates how a single event may generate multiple sessions. The application layer of the SIP interface provider transmits a message 1002 to the MMSE core about a new SIP event. The MMSE match profile for this call defines three applications capable of handling call data: (1) call data record; (2) automatic location identification; and (3) CAD/GIS. The MMSE core transmits a message 1004 to the event manager identifying the three applications that should receive this event. The event manager generates a new call data record and obtains a new identifier for this event 1006. The event manager also transmits the call information to the automatic location identification (ALI) application 1008. The event manager also transmits the event to a CAD or GIS system 1010. This transmission can occur before receiving a response from the ALI system. In the implementation shown, the CAD or GIS system can assign the event as a new call for a CTI or CAD agent to handle 1012. Later, when the ALI system identifies the location for the call 1014, a notification is sent back to the event manager. The event manager transmits this information to the MMSE core as an update to an existing event 1016. The MMSE core, by consulting its workflow rules, determines the applications that may use this updated information. In the flow shown, the CAD or GIS system are configured to receive the additional location information. Accordingly, the MMSE core instructs the event manager to transmit the location information for the event to the CAD or GIS system 1018. The CAD or GIS system then transmits an update call signal to the CTI or CAD agent 1020. In an implementation where the CTI or CAD agent is using a graphical user interface, the location information received from the ALI application for this call may be dynamically updated.

Figure 11:
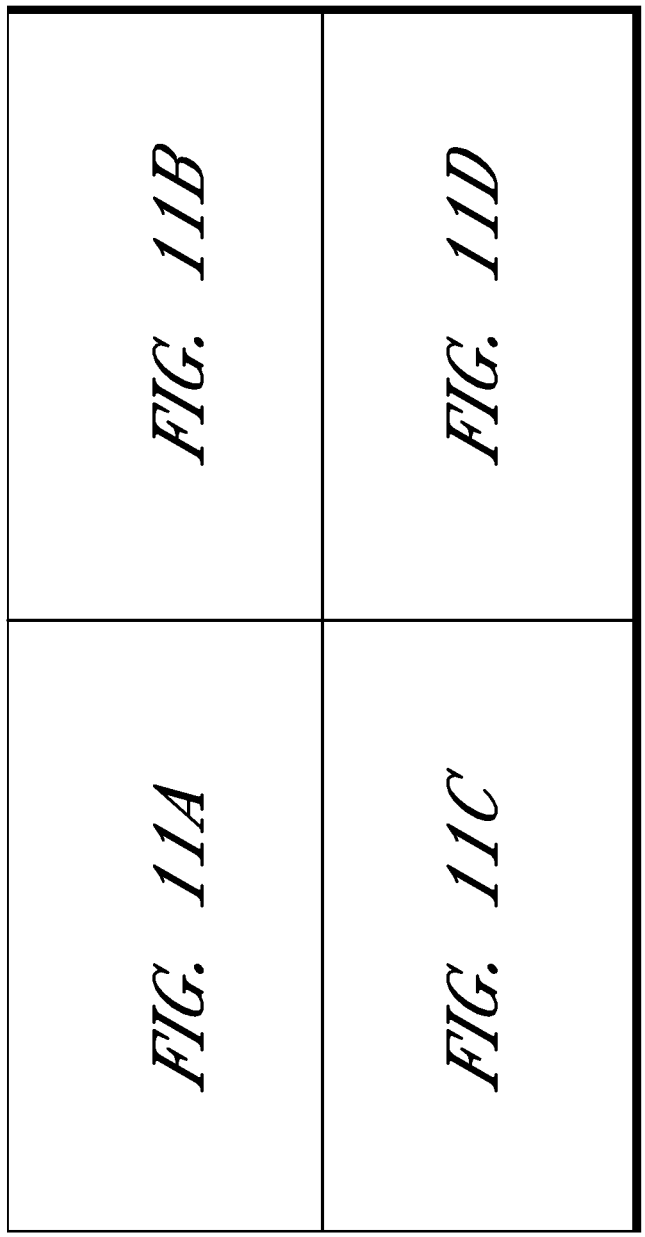
FIG. 11 illustrates a combination of FIGS. 11A-11D which, as combined, show an exemplary user interface for the system.
Figure 11A:
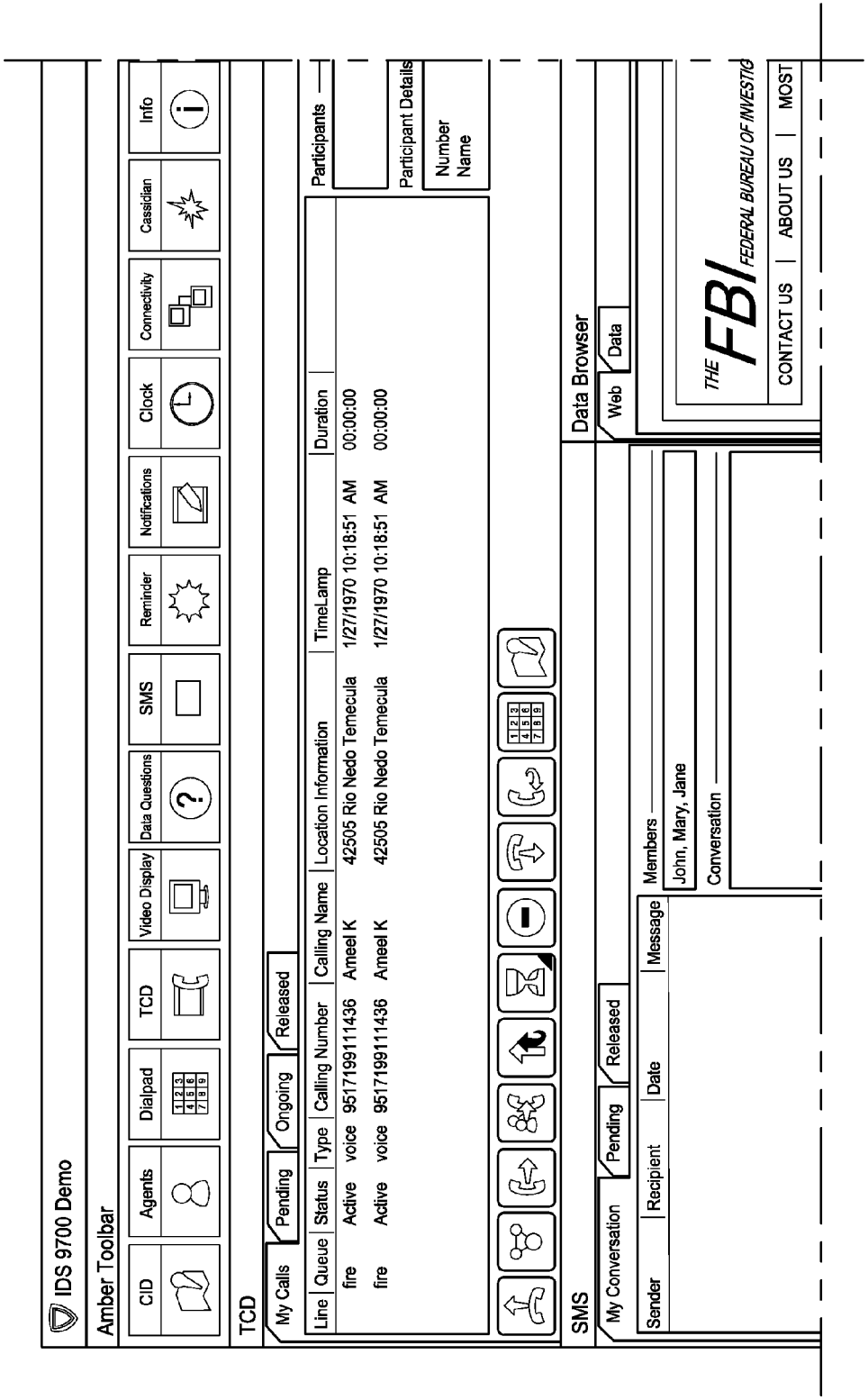
Figure 11B:
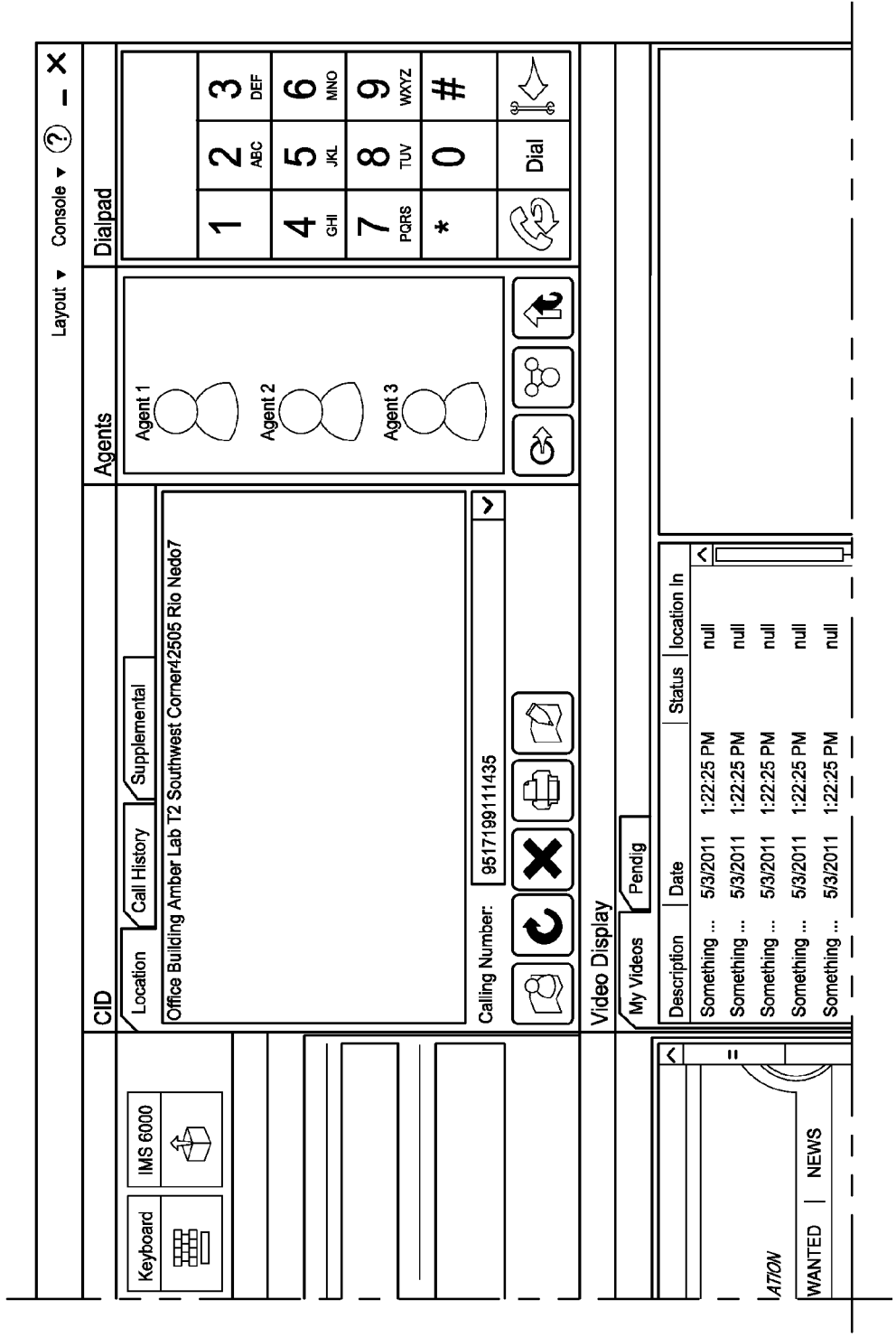
Figure 11C:
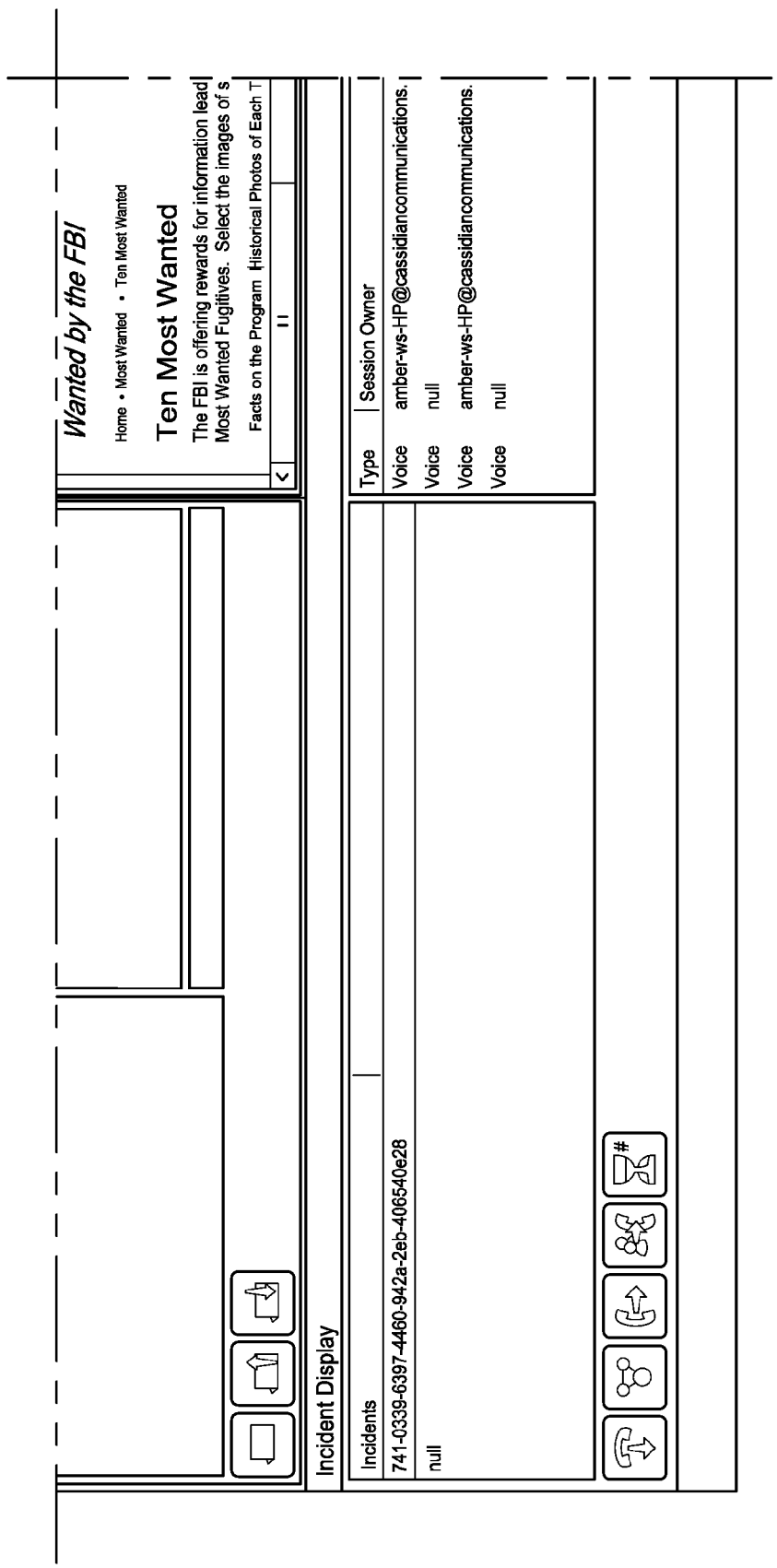
Figure 11D:
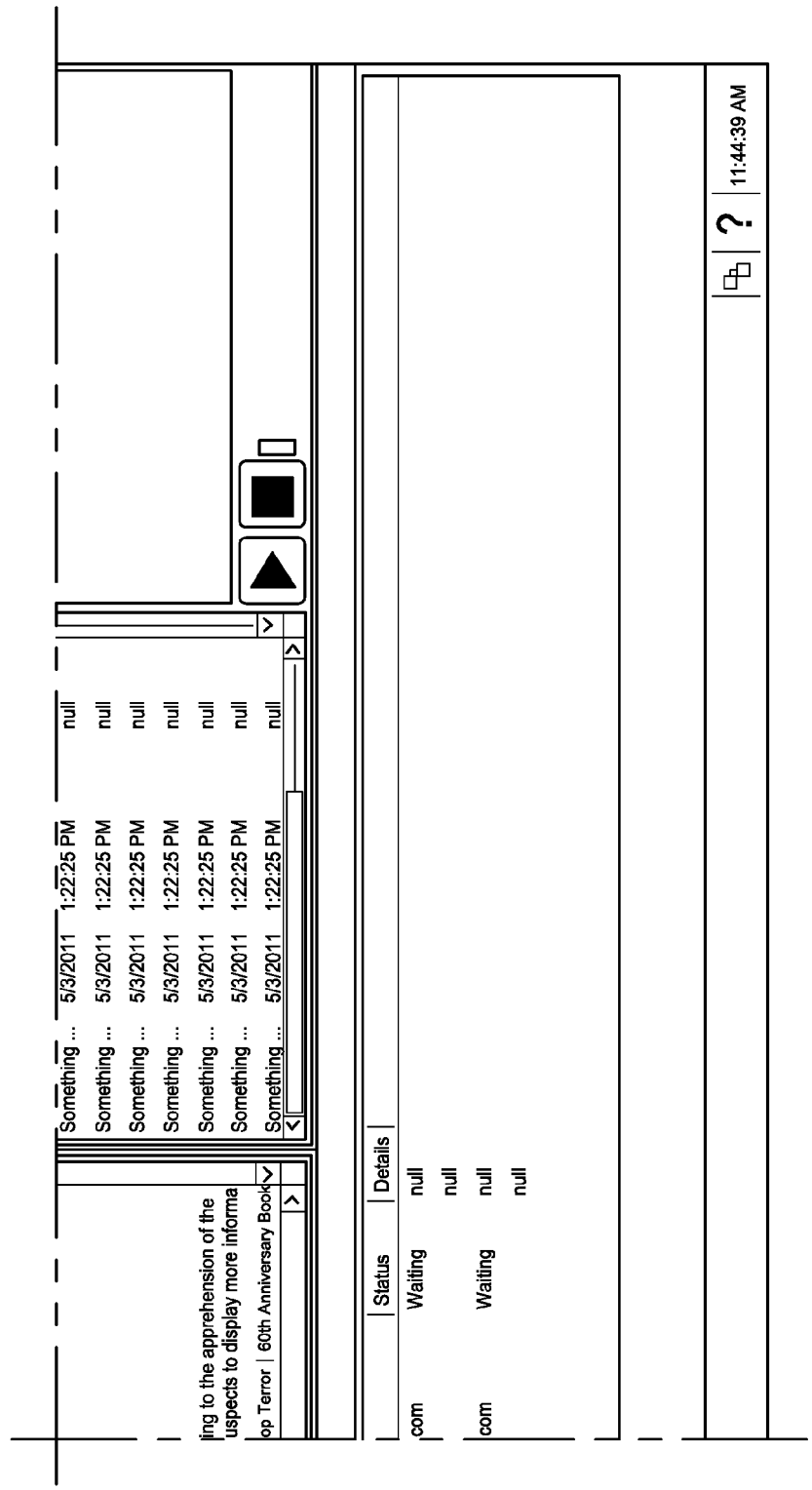

FIG. 11 illustrates a combination of FIGS. 11A-11D which, as combined, show an exemplary user interface for the system. The combination of FIGS. 11A-11D may collectively be referred to hereinafter as FIG. 11. The example user interface shown is a graphical user interface. The interface may be implemented as a light weight web application executing on a server. The interface may be implemented as a thick client interface. The interface may be configured to present different views based in part on factors such as the agent profile, the workstation rendering capabilities (e.g., video enabled, rich graphics, wireless device), the license governing the PSAP installation.

The example interface shown in FIG. 11 includes a telephone call display window. The telephone call display window includes several tabs. One tab included is a my calls tab. The my calls tab is configured to show all calls that the agent is working on. The window further includes an answer button. The answer button enables an agent to answer the call. In one implementation, when the client application receives a signal indicating a call to answer, an answer operation signal is sent to a call application included in the MMSE along with a session identifier for the call. The call application interfaces with the telephony module to direct the call to the agent's workstation.

The window includes a release button. The release button enables release (e.g., hang up) of the call by the agent. In one implementation, when the client application receives a signal indicating a call to release, a release operation signal is sent to a call application included in the MMSE along with a session identifier for the call. The call application interfaces with the telephony module to release the call from the agent's workstation.

The window includes a transfer button. The transfer button enables the agent to send the call to another destination (e.g., agent at the PSAP, agent at another PSAP, external system). In one implementation, when the client application receives a signal indicating a call to transfer, a transfer operation signal is sent to a call application included in the MMSE along with a session identifier for the call. The call application interfaces with the telephony module to transfer the call from the agent's workstation as described above.

The my calls tab also includes an information window. The information window displays data related to the selected call such as queue identifier, call status, calling number, call type, call location information, call time stamp, and call duration. The data displayed in the information window can be pushed to the information window from the MMSE. In another implementation, the client may retrieve the information directly from the data store.

In the example shown, the telephone call display window includes a pending tab. The pending tab shows the calls waiting in the queue. The pending tab may be configured to show calls pending at the PSAP, calls pending for certain agents (e.g., all agents of a common skill set or workgroup), or calls pending for an individual agent. The pending tab may include one or more buttons such as a select a call to enable the agent to activate a particular call, answer a call to enable the agent to answer a particular call, and priority answer to enable the agent to answer a call with a heightened priority. The pending tab may also include an information window for displaying data related to a selected call such as queue identifier, call status, calling number, call type, call location information, call time stamp, and wait time. As with the my calls tab, the information may be pushed to the client or fetched by the client.

The example interface shown in FIG. 11 includes a data browser window. This application contains a browser window on the client and connects to the web server on the MMSE server. The browser application contains pages for the agent to browse a caller's information such as their name, any registered members of the household, addresses, mitigating personal factors (e.g., physical disability, hearing impairment), photographs of the caller, or medical history. The data browser window may include one or more tabs. The browser page shall represent a household information page. This window can contain all the people living in the household and how many houses the caller has. The window can also contain detailed information about each resident of the household and details about the house.

In one implementation, the data application receives an event identifier from the event manager. The data application can use this identifier to obtain information about the event such as the location or phone number. Using this information, the data application can transmit a request for additional data. For example, the data application may execute a search of an online registry using the phone number (e.g., a web service). The data application can process the resulting information and provide additional data for the agent to consider. The data application may also provide resulting information back to the MMSE. This new information may be treated as a new event and processed, for example, as discussed above.

The data browser shown in FIG. 11 includes a summary tab. The summary tab is configured to display a list of people living in the house and indicate if the person has medical history or picture available. The houses section includes the address of the homes associated with the caller. The agent can click on the person name, medical icon or photo icon to get more information. If an agent clicks on the name, the people tab is displayed, clicking on medical icon opens up medical records, and clicking on picture opens a picture page.

The data browser shown in FIG. 11 includes a people tab. The people tab may include personal information about each of the people in the household such as age, description, occupation, parental contacts, married, children, social security number, healthcare provider. In one implementation, the data browser can include a separate tab for each resident of the household.

The data browser shown in FIG. 11 includes a houses tab. The houses tab may display information about the homes such as address, how many exit points, location of each exit, number of floors, neighbors, safety equipment installed (e.g., automatic sprinklers), security equipment installed (e.g., alarm system, gates, automated door locks), proximity to emergency equipment (e.g., fire hydrants, fire lanes), or blueprints. If a home an multi-unit complex, the houses tab may be configured to display the floor and unit number.

The data browser shown in FIG. 11 includes an others tab. The others tab may display contact information of other people who should be contacted in the event of an emergency.

The example interface shown in FIG. 11 includes a message window. The message window is configured to display incoming SMS/MMS message requests as well as transmit outgoing SMS messages. The message window may include one or more operation buttons. For example, in one implementation, the message window includes an answer button. The answer button allows an agent to response to a received message. The operations (e.g., routing, answer, dismiss) for the SMS/MMS window are handled in a similar fashion to the call window. A signal containing the desired operation and the SMS/MMS session identifier is transmitted to the SMS/MMS application. The application interfaces with the appropriate systems to effect the desired operation.

The message window may be configured to support tabs. For example, the message window may include a pending tab to display messages received but not yet viewed. The message window may include a my messages tab to display messages to and/or from the agent accessing the message window.

The example interface shown in FIG. 11 includes a video display window. The video display window is configured to allow video streams to be sent to the agent using a client application. The video can either be streamed live from an external source via the MMSE or stored and streamed directly from the server directly. In one implementation, when a call is answered by the agent, the MMSE core can be configured to determine if video is available based in part on the call. The MMSE includes a video application. The MMSE core can be configured to notify the video application if a video is available. The video application with send a message to the video client with the list of video files available for the call. The video display window renders this list and receives a signal indicating a video to be played. In the implementation where the video is streamed through the MMSE, the selection is transmitted to the video application and a video stream is opened in response. For example, the communication between the video client and the video application may be an HTTP web service. The video client generates a message identifying the video to view. This message is transmitted to the interface of the video application. After parsing the message, the video application begins to retrieve the video data and transmit a stream back to the video client. The video application may transform the video prior to streaming to the video client for example by re-sampling, buffering, increasing gain, introducing watermarks, or other audio/video processing. The streaming may be performed by module in communication with the video application such as a RealNetworks Helix server.

The video client may support a play and/or stop button. These buttons would control the playback of the selected video. The video client may also support a time slider indicating the point of play back for the selected video. The time slider may be adjusted to indicate a desired point of playback in the video.

The video client may support a record button. The record button generates a signal to the video client indicating the video stream should be recorded. The recording may be temporarily stored on the client workstation. The recording may be transmitted to the MMSE and stored in the data store thereby making the recording accessible to other users of the system.

The example interface shown in FIG. 11 includes a session group display window. The session group display window is configured to display session group data. The session group window may be configured to show which sessions are active for the session group or all sessions for a given session group.

The session group display window may render sessions handled by the agent accessing the client application in a different color or with an icon to distinguish it from other sessions.

Other windows that may be included on an interface include a dialer pad for making out going phone calls, a radio window for receiving radio data, a session group window for selecting and associating sessions with a session group, and an interface configuration window to allow an agent to organize the layout characteristics of the interface. The interface may include an automatic location identification (ALI) window. The ALI window is configured to display location data. As previously discussed, the information may be pushed to the client or fetched by the client. In one implementation, the ALI window supports clearing the associated ALI window information.

Figure 12:
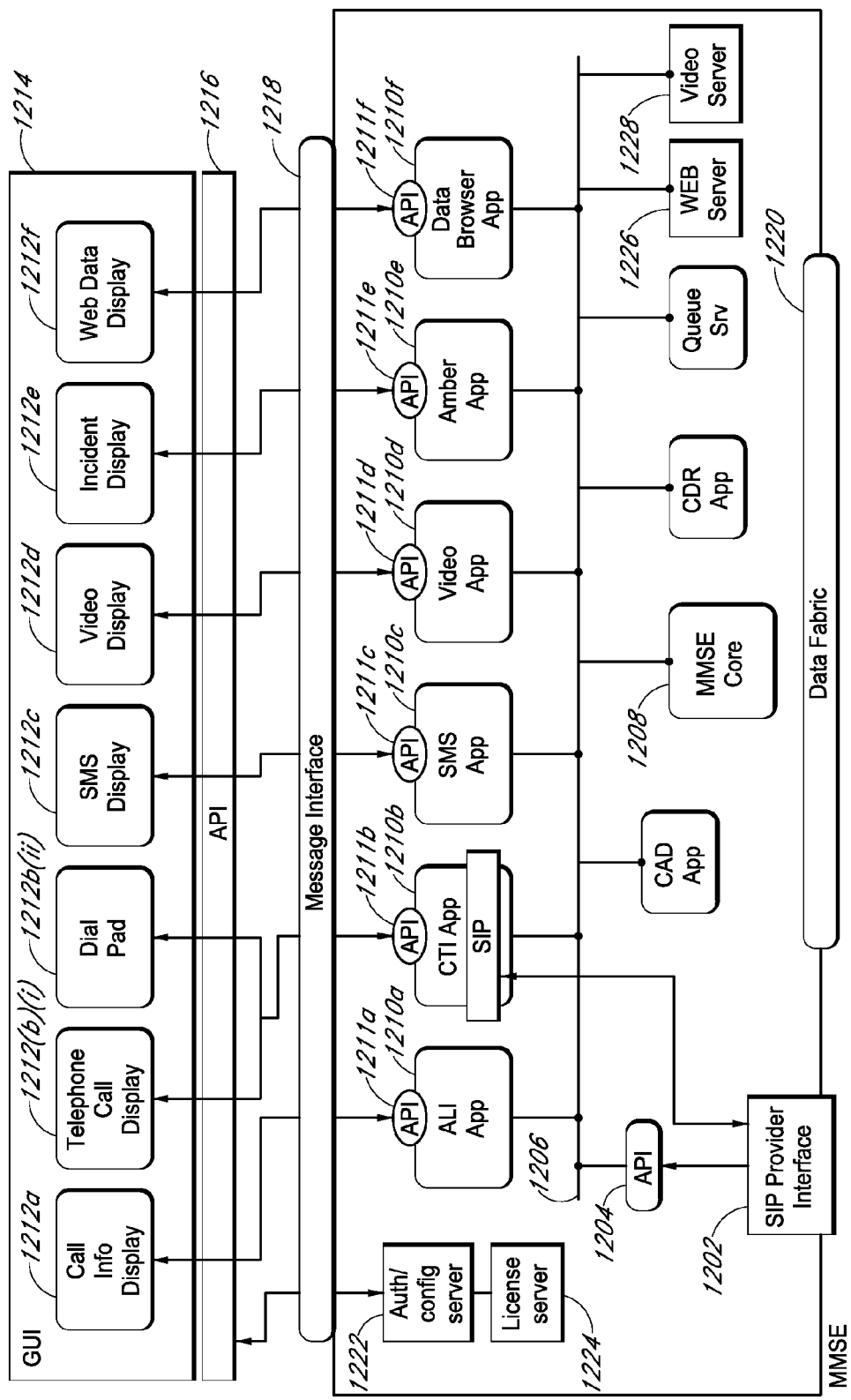
FIG. 12 is an exemplary block diagram of an implementation for client connectivity with the system.

FIG. 12 is an exemplary block diagram of an implementation for client connectivity with the disclosed system. As an event is received at a SIP provider interface 1202, the SIP event is transmitted via an API 1204 to a MMSE data bus 1206. As described above, the SIP event can be processed by the MMSE core 1208 (e.g., rules engine, policy engine, event manager). The MMSE core then transmits the processed event data to one or more MMSE applications 1210a-1210f. Each application generally has a corresponding client module, for example, on a GUI 1214. The client application may further process the event and, via an API 1211a-1211f, transmit the event to a message interface 1218. One example of a message interface is Rabbit MQ.

In the implementation shown in FIG. 12, the client shown is a graphical user interface (GUI) 1214. The graphical user interface 1214 includes a variety of display modules 1212a-1212f similar to those described above in reference to FIG. 11. The client interface also includes an application programming interface (API) 1216. In one implementation the API 1216 is a message queued interface. The application programming interface 1216 receives messages from the MMSE and delivers them to the appropriate display module(s) 1212a-1212f. In this way, pushing data from the MMSE to a display window can be accomplished. In another implementation, the API may also allow the display modules to transmit requests to the MMSE, thereby creating a bi-directional interaction with the MMSE.

Each application and each corresponding display element is decoupled from each other. The link between the applications is the common data base, shown in FIG. 12 as a data fabric 1220. Accordingly, the failure of one application does not necessarily mean the entire MMSE will fail. By reducing the interdependence between the applications, the disclosed system enables higher fault tolerance and thus higher availability than a tightly coupled system. Furthermore, the separation of components allows customized MMSE and client interfaces that feature only the components desired at a site. For example, a PSAP may not have the capability to process SMS messages. In this example, the SMS app and corresponding SMS display client module may be disabled. Accordingly, system resources need not be expended maintaining these features.

The implementation shown in FIG. 12 also includes an authorization and configuration server (Auth/Config Server) 1222. This server may control the overall operation of the client and MMSE by providing a common repository for authorization and configuration information. For example, the authorization server may determine whether a given agent may access the system. The configuration server may be used to enable certain applications as discussed above. In one implementation, the MMSE queries the configuration server for the modules to be instantiated.

The implementation shown in FIG. 12 includes a license server 1224. The license server 1224 can be used to control the available modules based on features purchased by the customer. For example, each MMSE application may be individually licensed. A standard installation may include the code necessary to execute each application, but the ability to do is may be controlled by the license server 1224. In this example, if a customer obtains the appropriate license for the video application, the appropriate designation is made at the license server 1224. In one implementation, this may include generating a license file. When the authorization and configuration server attempts to instantiate a module, it may be configured to consult the license server 1224 to ensure the proper authorization to execute the selected module.

The implementation shown in FIG. 12 includes a web server 1226. The web server 1226 may be used to publish documents at the PSAP. The web server 1226 may be configured as the host for service interfaces to the MMSE (e.g., web service). The implementation shown includes a video server 1228. The video server 1228 may be configured to playback, store, or record video for the MMSE. The video server 1228 may interoperate with the video application.

As discussed above, content may be sent to the system from a variety of sources. One source may be email. In one implementation, an email service included in the system may be configured to receive email messages, process the messages, and autoreply to one or more users upon successful delivery. Email can be associated with an existing emergency call or can itself instantiate a separate session. An email message can contain text, multipart body or any attachment. This combination of data may provide information to the agents who may ultimately address the email message.

The email service may be implemented in specially adapted hardware configured to receive electronic signals including the email message. The email service may be implemented as instructions which may be executed by a processor of an apparatus.

The email service may include a multimedia service engine interface. The multimedia service engine interface may be configured to notify the system of new email, agent answer, agent complete, out bound email, or other events which may be associated with an email message. The multimedia service engine may be configured as, for example, described above in FIG. 2.

The email service may be configured to provide and/or obtain data from the data storage, such as the data storage 312 described above. For example, the email service may store the email message in the data storage 312. As part of storing the email message, the email service may be configured to create a session for new emails. The email session may include a state of the session as well as a reference to the email itself in the server (e.g., an email identifier and/or server address).

The email service may include an application message interface. The application message interface may be a queued message interface such as that described above in FIG. 3. The application message interface may be configured to communicate messages associated with email messages to the agent and/or agent actions. For example, the application message interface may transmit parsed information from the email message (e.g., attachments) to an agent workstation. The application message interface may be configured to receive information from other system elements such as autoreply information for an event associated with the received email message.

Figure 13:
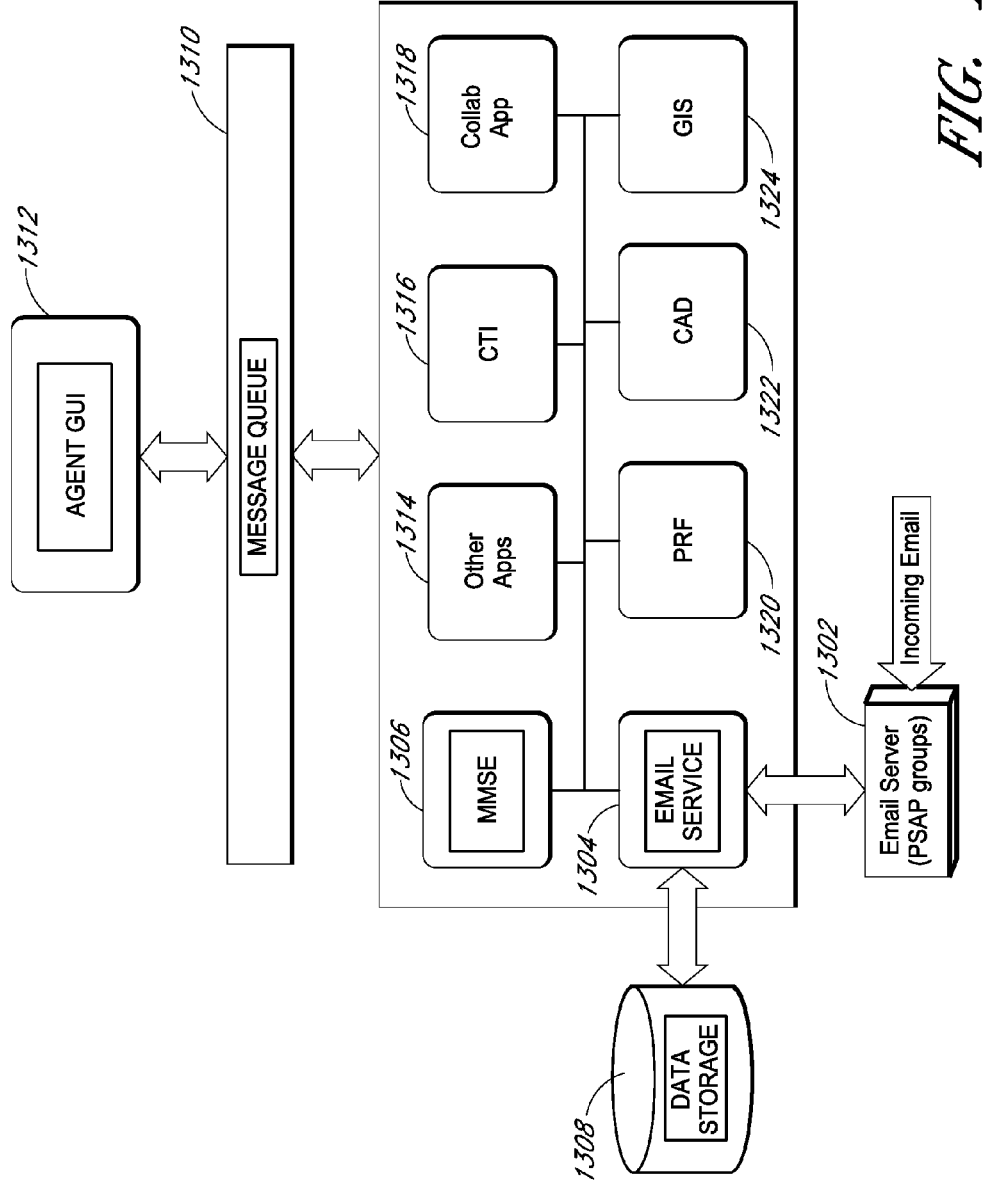
FIG. 13 illustrates an exemplary system configuration for email management.

FIG. 13 is a block diagram illustrating an exemplary system configuration for email management. The system may implement one or more of the features described above. The system of FIG. 13 includes an email server 1302. The email server 1302 may be associated with a PSAP group. The email server 1302 may be configured to receive incoming email messages. The email server 1302 may be configured to communicate with an email service 1304. The email service 1304 may receive a signal indicating the arrival of an email message. The signal may include one or more of the email message, an identifier associated with the email message, attachments associated with the email message, or the like.

The email service 1304 may be configured to create a new session for the incoming email. For example, the email service 1304 may extract information from the email such as a header field (e.g., the mime content-description), an incident tracking identifier, the device identifier, message subject, message sender, and group from/to header. The email service 1304 may be configured to store the identified information in the session data.

The email service 1304 may be configured to determine if there was data attached to the email and extract that data into a data store 1308. The data store 1308 may be organized based on incident tracking identifier. Some implementations may include an attached flag to indicate that additional information was attached to the session (e.g., email message).

The email service 1304 may be configured to cause transmission of a message to a multimedia service engine 1306. The message may include information about the new email session such as a session identifier and/or an email identifier to the multimedia service engine 1306. The message may be transmitted directly to the multimedia service engine 1306. In some implementations, the message may be provided using the data store 1308 or message queue 1310. In such implementations, the multimedia service engine 1306 may be configured to monitor the intermediate location for the presence of new messages. Once obtained, the multimedia service engine 1306 may be configured to process workflows associated with email as described above and below.

For example, the multimedia service engine 1306 may be configured to apply one or more match policies to determine if this email message is associated with an active incident that may have other sessions being managed by an agent. If the multimedia service engine 1306 can match an attribute associated with the email message such as the incident tracking identifier or sending device identifier with an existing active session in the system, the multimedia service engine 1306 may be configured to add the new email session to the existing incident.

The multimedia service engine 1306 may be configured to notify a policy and routing function 1320 to queue the email for delivery to the appropriate agent. For example, the multimedia service engine 1306 may transmit a signal including the identifier for the email message along with an identifier for the agent a message queue 1310. The identification may obtain the agent information from an automatic call distribution system as described above.

The multimedia service engine 1306 may be configured to determine if data is associated with the email such as attachment data. If so, the multimedia service engine 1306 may also notify an application service 1314 of new data. For example, if the email includes an image file, the multimedia service engine 1306 may transmit a signal to an image application service identifying the image data. The determination may be based at least in part on a header field of the email message (e.g., mime-type).

Accordingly, the email may be processed and displayed via an email user interface element while the data may be simultaneously displayed using a data user interface element. The interface element may be included in an agent graphical user interface (GUI) 1312.

The policy and routing function 1320 may be configured to determine if the email is associated with an active call handled by an agent. In such cases, the policy and routing function 1320 may deliver a queue notification to the agent of the new email. If the email session is not associated with an active incident, the policy and routing function 1320 may be configured to queue the session in the group email queue and send a queue notification to all agents subscribed to the group/mail queue.

Agents may access emails queued in the session group that they are subscribed to, such as via the agent GUI 1312 or via an email client. Session group subscriptions may be automatically assigned to agents based on the PSAP the agent is working in. Agents may also subscribe to a session group via an interface element included in the agent GUI 1312. The subscription information may be stored in the data store 1308 and obtained by the policy and routing function 1320 for use in processing and/or routing received content. In some implementations, the subject line in the queue for each email is displayed. Agents can select an email in the queue via the agent GUI 1312. The selection may trigger an answer request to the email application. The email server 1302 may copy all or a portion of the email from the group email account into the agent email account. The original email may be stored in the group email account. This provides an audit trail for the email as it is process by the system.

The email may be pushed, for example through SMTP, to an email client (e.g., Mozilla Thunderbird) at the agent workstation and displayed in a multimedia service engine UI email window.

Once an email is selected, the email may be removed from the queue. The email may be marked as read once delivery to an email client is confirmed. For example, when the email is selected via the agent GUI 1312, a signal may be transmitted via the message queue 1310 to the email service 1304. In some implementations, a read receipt is sent back to the originator that the email has been received and read with the appropriate time stamp.

If an agent is active in a conversation (e.g., voice or SMS/real time text (RTT)) and an email is received by the system for that incident, the email may be automatically routed to the agent that is handling that conversation. The routing may be determined by the multimedia service engine 1306. The engine 1306 may direct the policy and routing function 1320 to directly deliver the email to the agent without the email being queued as described above. The email may be copied to the agent mailbox as discussed, and the agent will be notified on the UI that an email for that conversation is available to be viewed. The agent may select answer to open the email and have the contents appear in the email window.

Once the email is opened and displayed, a read receipt may be sent back to the originator with read timestamp.

Multiple agents may be conferenced on an email message. For example, the carbon copy email header field may be used to include additional agents on an email message. The blind carbon copy may be used to allow agents to view the session, but not necessarily participate. Accordingly, the efforts of multiple agents may be coordinated for an email session.

The system shown also includes a computer telephony interface (CTI) 1316. The system also includes collaboration application service 1318. The system shown includes a geospatial information system (GIS) 1324. The system shown further includes a computer assisted dispatch (CAD) server 1322. Each service may be configured to receive information such as via the message queue 1310 and/or data store 1308 associated with the email message.

Figure 14:
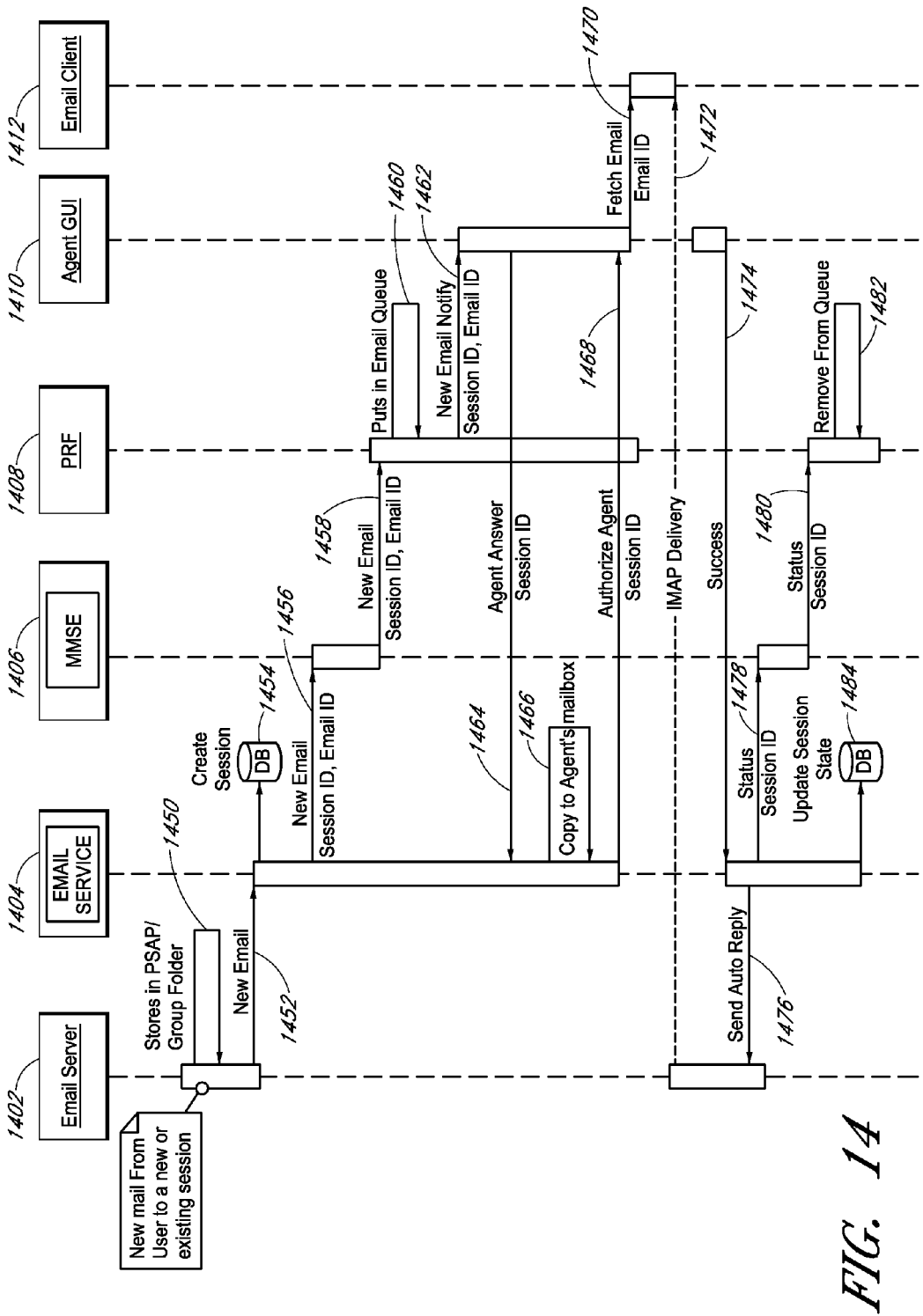
FIG. 14 illustrates a call flow diagram for an email message.

FIG. 14 illustrates a call flow diagram for an email message. The call flow diagram illustrates the signals that may be exchanged between example entities which may be included in a multimedia data management system. The implementation shown in FIG. 14 includes an email server 1402, an email service 1404, a multimedia service engine 1406, a policy routing function 1408, an agent workstation/GUI 1410, and an email client 1412. The entities shown in FIG. 14 may be configured in a system such as that shown in FIG. 13 above.

When a new email message is received by a particular PSAP/group, the email server 1402 may be configured to store the mail in a group inbox associated with the identified PSAP/group via signal 1450. The email sever 1402 may be a sendmail server, postfix server, James server, or other server adapted for sending and receiving email messages. In some implementations, the email server 1402 may be configured to transmit a notification 1450 of the received message to the email service 1404.

The email service 1404 may be configured to generate a session 1454 for the received message. The session may be similar to the session discussed above in FIG. 6. The session may include a session identifier value, a session create time, and a value indicating the data which caused the session to be generated (e.g., email identifier). The session 1454 may be generated based at least in part on one or more of the content of the message, header values included in the message (e.g., email identifier, subject), the source of the message (e.g., sender email address, sender email server, sender device, sender location), and the email server. In some implementations, the email service 1404 may be configured to store the message and associated session identifier in the data storage (e.g., data fabric). An email may be associated with a unique email identifier value. The unique email identifier value may also be stored and may uniquely identify that particular email. As such, the email identifier can be later used for searching mail in the PSAP/group folder. The session 1454 may store the location of the email on the server (e.g., email ID) but not the full email itself. The full email may be retrieved based on the session identifier and/or email identifier. In some implementations, a session identifier may be based at least in part on one or more of a PSAP identifier and a group identifier.

Email messages may include an incident identifier and session identifier in the subject field. This may be pre-populated for incoming or outgoing messages. If an unsolicited email arrives and does not include an incident or session identifier, then email service 1404 may be configured to identify an existing session/incident or generate the values as described above. In some implementations, an agent receiving the message may associate the message with a session and/or incident.

Although the call flow of FIG. 14 is using email as the session content, it will be appreciated that a similar call flow may be used to receive SMS/MMS messages, video, or other multimedia data.

The email service 1404 may be configured to transmit a notification signal 1456 to the multimedia service engine 1406. The notification signal may include values indicating a new email event. The notification signal 1456 may include the session identifier and/or email identifier associated with the received email.

The multimedia service engine 1406 may be configured to transmit a similar notification signal to the policy and routing function 1408. The PRF 1408 may be configured to queue the session for an agent to review via signal 1460. The PRF 1408 may queue the received email or information associated therewith (e.g., email identifier) in an email queue. The email queue may be identified as a non-ACD, priority answer queue. Other attributes may be associated with the queue and used to determine the priority with which items appearing in the queue are routed for agent review. In some implementations, multiple email queues may be included. In such implementations, the PRF 1408 may selectively route the emails to different queues based on rules applied to values included in the email message. For example, if an email is received from certain domains (e.g., whitehouse.gov), the email may be routed to a high priority queue for expedited processing.

Once queued, a signal 1462 may be transmitted to the agent GUI 1410 indicating the presence of a new email. An agent may select the message to begin processing the email message. For example, the agent may use a graphical user interface presented on a workstation to view the email message. When the email message is selected for processing, the GUI may be configured to send an answer request 1464 to the email service 1404. The request signal may include the email identifier, the agent requesting access to the message, or other information to identify the message and credentials for the agent.

Based at least in part on the received information, the email service 1404 may be configured to approve this agent for email handling. Once an agent has been approved to access the message, the email service 1404 may indicate the state for this email as assigned. An agent may not receive approval if, for example, another agent has selected the message for processing. Accordingly, multiple agents may avoid duplicate handling of a single message.

This state may be used to process additional answer requests from the agent. For example, if the assigned agent attempts to answer a subsequent message, the request can be dumped as, in some implementations, a one to one relationship between agents and assigned answered messages may be maintained. In some implementations, agents may be assigned multiple messages.

Once an agent has been approved to answer a particular email message, the email service 1404 may be configured to copy the email message from a PSAP/group mailbox to a mailbox associated with the agent via signal 1466. The agent GUI 1410 may be configured to transmit a signal 1470 to cause the email client 1412 (e.g., Mozilla Thunderbird, Microsoft Outlook, Eudora Mail or Lotus Notes) to fetch mail associated with the email identifier assigned to the answered message.

After mail is delivered to email client 1410, such as via IMAP delivery signaling 1472, the agent GUI 1410 may be configured to transmit a response 1474 to the email service 1404 including a value indicating a successful delivery status. The email service 1404 may be configured to update the session record to reflect the new status via signal 1484. The email service 1404 may be configured to provide this status to the multimedia service engine 1404 via signal 1478. The multimedia service engine 1404 may provide a corresponding status update 1480 to the policy and routing function 1406. The PRF 1406 may be configured to remove this message from email queue via signal 1482.

In some implementations, the delivery of the message to the email client 1412 may be disrupted. For example, the agent workstation may experience an equipment failure prior to delivery. In such cases, the email service 1404 may be configured to place the message back into the queue for the PSAP/group. Accordingly, an agent may subsequently attend to the message. The email service 1404 may determine a failure based on the absence of a success signal 1474 within a configurable period of time (e.g., five seconds).

In some implementations, after a message is removed from the queue, an auto reply 1476 may be sent to the user through the email server 1402. It may be desirable to also close the session associated with the email message. Furthermore, in implementations including a session time, transmitting the auto reply message may cause the session timer to stop.

As the call flow progresses, events associated with a message may be logged. For example, when an email arrives in the system a session identifier, email header information, MIME content-description, and a time stamp may be logged. When the email is queued, the email identifier, queue identifier/PSAP associated with the queue, and a timestamp may be logged. When the email is delivered to an agent, the email identifier, an agent identifier, and a timestamp may be logged. If a delivery failure is detected, the email identifier, agent identifier, failure reason, and a timestamp may be logged.

Multimedia data may be provided to the system through a variety of channels. For example, an email client may be used to send an email message to the multimedia service engine, a telephone may be used to initiate an emergency call, and a video camera coupled with a network may be used to provide video and/or audio. In some implementations, a device may include the inputs to capture textual and data information. Such devices may be specially configured to provide this information to the multimedia service engine. These devices may be generally referred to as multimedia service engine clients.

Figures 15, 16:
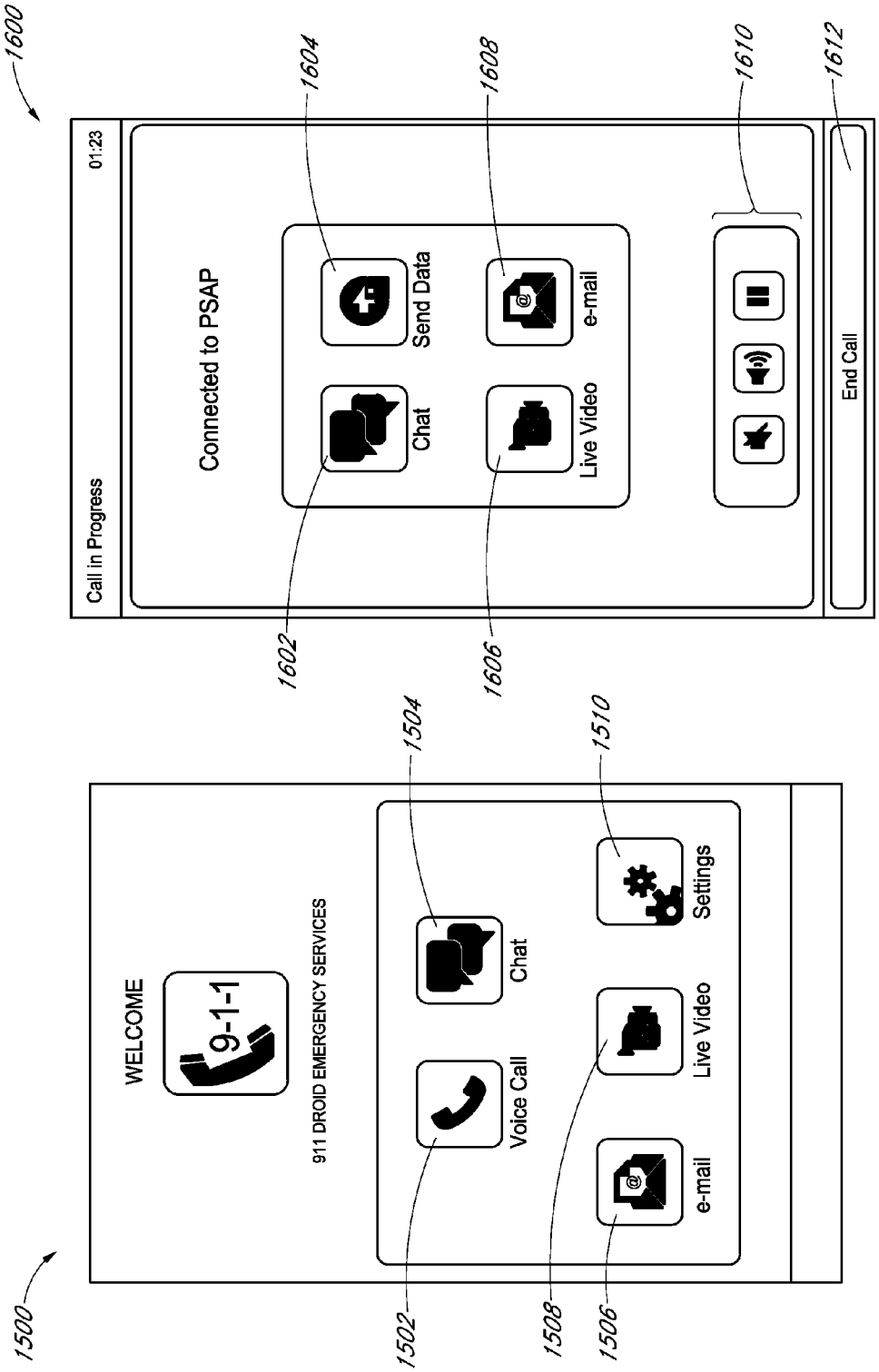
FIG. 15 shows an interface diagram for one example of a multimedia service engine client.
FIG. 16 shows an interface diagram for an example of a multimedia service engine client engaged in an active call.

FIG. 15 shows an interface diagram for one example of a multimedia service engine client. The multimedia service engine client interface 1500 includes several elements which may provide information to a multimedia service engine. As shown in FIG. 15, the interface includes a voice call element 1502, a chat element 1504, an email element 1506, a live video element 1508, and a settings element 1510. In some implementations, the interface 1500 may also include a data element.

The settings element 1510 may be configured to transmit and receive signals with a network configuration module. The network configuration module may be configured to receive input signals identifying an emergency multimedia server (e.g., by URL or IP address) to connect with. The emergency multimedia server may be configured to route information from the multimedia service engine client to the correct multimedia service engine associated with a PSAP based on location of the device.

The settings element 1510 may be configured to transmit and receive signals with a profile module. The profile module may be configured to obtain a collection of voluntary data from the user that they would like to have available to the emergency call operator during emergency communication sessions. The profile data may include: first name; last name; phone number; personal picture; one or more home addresses; a work address; one or more emergency contacts including a phone number, email address, relationship, and/or mailing address for the emergency contact; medical information (e.g., prescriptions, conditions, allergies, disabilities); doctor contact information; contact information for one or more children or parents; family information/pictures; additional notes information for freeform additional data.

The user profile information may be saved locally on the device. In some implementations, the user profile information can be uploaded/synchronized with a user profile service. The user profile page shall allow the entry of connection information (e.g., URL, username, password) for the user profile service. The upload/synchronization process may be performed according to a schedule. The user profile information may be transmitted to the user profile service for storage in a subscriber database. The stored user profile information may be accessed by the device or another authorized entity. For example, a subscriber of the user profile service may authorize the user profile service to provide the profile information to 9-1-1 operators during an emergency call originating from the device.

The voice call element 1502 may be configured to call 9-1-1, the chat element 1504 may be configured to transmit and/or receive text messages, the email element 1506 may be configured to transmit an email, the data element (not shown) may be configured to send data, and the live video element 1510 may be configured to stream video. When making a call to 911 or initiating any session to 911, the multimedia service engine client may be configured to receive a confirmation to acknowledge the session. This confirmation may be used to prevent accidental calls. For example, if the confirmation is not received after a preconfigured period of time, the call may be canceled (e.g., not placed).

When "call 9-1-1" is selected and confirmed, the device may be configured to activate a phone mode and initiate a call to the endpoint configured in the network settings. The client used for phone mode may be configured as a SIP voice client, sending an INVITE message to the endpoint. As discussed above, this may generate a session which may be associated with one or more session groups and incident. Once the call is established multimedia service engine client may be connected to an agent. The multimedia service engine client may be configured to receive a disconnect signal to cause the termination of the call.

In some implementations, the codec for establishing voice call can be G7.11 using DSCP value of 40 for quality of service. The voice client may also support incoming calls from the agent using SIP.

FIG. 16 shows an interface diagram for an example of a multimedia service engine client engaged in an active call. Once the voice channel is opened, additional information may be transmitted to/from an agent via, for example, text message, data, or video. A chat element 1602, a send data element 1604, a live video element 1606, and an email element 1608 are shown in FIG. 16. An element may be activated while the voice call is connected.

When the texting mode is activated via the chat element 1604, a text message to the endpoint configured in the network settings is initiated. In some implementations, the client used for texting mode may include an RTT client, initiating an RTT session with the server. The RTT client may support the RFC 4103 and 5194 for communicating with the server. The RTT client may also support incoming session requests from the agent using RTT. Once the session is established, the multimedia service engine client may be connected to an agent and can begin a dialog with the agent until disconnecting by pressing disconnect button.

The multimedia service engine client may be configured to receive manually entered text messages. The multimedia service engine client may be configured to receive a selection of a preconfigured message such as via a drop down.

When the send data mode is activated, such as via the send data element 1606, the call or text session continues while the multimedia service engine client receives an input identifying which content to transmit to the agent. Data that may be transmitted includes user profile information, pictures in storage coupled with the multimedia service engine client, and videos in storage coupled with the multimedia service engine client.

In some implementations, the data may be transmitted to the agent using HTTP Post. The multimedia service engine client may request the post location for the PSAP associated with the agent handling the call. The post location may be the multimedia service engine server IP address or URL.

In some implementations, the multimedia service engine client may be configured to auto send data when the session is connected. For example, the multimedia service engine client may be configured to transmit the user profile information once connected.

When the streaming video mode is activated, such as via live video element 1606, the call or text session continues while the multimedia service engine client establishes a video link. The video link may be established using the SIP client. For example an INVITE message may be sent to the server address configured in the network settings. In some implementations, the streaming video mode may be started and stopped based on signals received by the multimedia service engine client (e.g., via button push).

The multimedia service engine client may also be configured to send an email to the agent during and after the communication session is completed. The email element 1608 may be used to receive email information and transmit the same. The email may be transmitted via an SMTP client. The email client may be configured to host an SMTP gateway on the device associated with the multimedia service engine client. The SMTP gateway may be configured to send and receive email.

The email mode may be configured to receive both text input as well as attachments of locally stored data. The multimedia service engine client may be configured to include an incident identifier provided from the voice or text communication session in the subject field of the email. The identifier information may be automatically populated when sending an email during an active session. If sending an email while not on an active session, the client may receive an incident identifier (e.g., text input, selection from drop down of most recent incidents) and the application will include this information in the subject line.

The multimedia service engine client may be configured to receive notifications, such as those described above, when the email is received by the agent. The notifications may include a timestamp.

As the multimedia service engine may be used to process information for critical applications such as emergency services, it may be desirable for some implementations including a multimedia service engine to include fault tolerance features. A load balancer may be included to manage traffic through the system. Servers may be associated with the load balancer. Some servers may be designated as "active" servers. An active server generally refers to a server that is presently available to service requests. An active server is further configured to synchronize its data via the data store (e.g., data fabric) with other servers. Some servers may be designated as "standby" servers. A standby server generally refers to a server that is configured to service requests, but is not actively doing so.

Requests may be received from a client over a network such as ESInet. The request may be routed to one of the active servers based on the load of the servers. For example, if a first active server is currently experiencing a higher load as compared to the load of a second server, a request may be routed to the less loaded second server. The load information may be transmitted to a central router which may be implemented in hardware or software. The load information may be current load, historic load, aggregate load (e.g., average), or the like.

The client may be configured to register with a network address such as an IP address. The IP address may be dynamically assigned to a physical server. If the physical server becomes unavailable, the standby sever may associate with the IP address assigned to the physical server. Accordingly, the standby server may continue communication with the client despite the unavailability of the physical server initially attached to.

Additional fail-over and fault tolerance measures may be included to further enhance the availability and processing of multimedia data.

Further innovative aspects include a method of associating multimedia data with a communication session. The multimedia data may include at least one of voice data, video data, text message data, email, image data, geospatial data, and audio data. The method includes transmitting a first signal to initiating the communication session. The first signal may be transmitted, for example, to an emergency management system. The method further includes receiving a session identifier. The method also includes transmitting a second signal including the multimedia data and the session identifier.

In some implementations, the communication session may include one of a voice communication session and a text messaging communication session. In some implementations the session identifier may include an incident tracking identifier. The session identifier may be included in a session initiation protocol message such as, for example, in a header field of the session initiation protocol message. The second signal may be transmitted while the communication session is active or after the communication session is terminated.

In some implementations, the session identifier may be stored. Transmitting the second signal may include resenting stored session identifiers. Transmitting the second signal may further included receiving a third signal identifying one of the stored session identifiers. Including the identified stored session identifier in the second signal may be a further aspect of transmitting the second signal.

In some implementations, the email may include an attachment, the attachment including additional multimedia data. An email may include the session identifier in a header field of the email.

A method of associating multimedia data with a communication session is provided in a further innovative aspect. The communication session may be one of a voice communication session and a text messaging communication session. The multimedia data may include at least one of voice data, video data, text message data, email, image data, geospatial data, and audio data.

The method includes receiving a first signal from a device to initiate the communication session. The method further includes generating a current session identifier for the communication session. The method also includes transmitting a second signal including the current session identifier to the device. The method also includes receiving a third signal including the multimedia data and the current session identifier. The method also includes associating the received multimedia data with the communication session associated with the current session identifier.

In some implementations, generating a current session identifier may include, when an attribute of the received first signal is associated with an attribute of a previous communication session having a session identifier, generating a current session identifier equal to the session identifier of the previous communication and otherwise, generating a current session identifier based at least in part on the received first signal. The attribute of the received first signal may include at least one of a sender identifier, an identifier of the device, and content included in the received signal.

In one or more implementations described, the current session identifier may include an incident tracking identifier. The second signal may include a session initiation protocol message. The current session identifier may be included in a header field of the session initiation protocol message.

The third signal may be received while the communication session is active. In some implementations the third signal may be received after the communication session is terminated.

In yet another innovative aspect, a device for transmitting multimedia data for association with a communication session is provided. The device includes means for transmitting a first signal to initiate the communication session. The device includes means for receiving a session identifier. The device further includes means for transmitting a second signal including the multimedia data and the session identifier. The device may be configured to implement one or more of the methods described above.

In some implementations, the means for transmitting a first signal to initiate the communication session comprises at least one of means for initiating a phone call and means for initiating a text message. In some implementations, the means for receiving a session identifier comprises at least one of a processor. In some implementations, the means for transmitting a second signal includes at least one of means for transmitting voice data, means for transmitting video data, means for transmitting text message data, means for transmitting email, means for transmitting image data, means for transmitting geospatial data, and means for transmitting audio data.

In another innovative aspect, a device for receiving multimedia data for association with a communication session is provided. The device includes means for receiving a first signal from a device to initiate the communication session. The device includes means for generating a current session identifier for the communication session. The device includes means for transmitting a second signal including the current session identifier to the device. The device includes means for receiving a third signal including the multimedia data and the current session identifier. The device includes means for associating the received multimedia data with the communication session associated with the current session identifier.

In some implementations, the means for receiving the first signal to initiate the communication session may include means for initiating a phone call and means for initiating a text message. In some implementations, the means for generating a current session identifier for the communication session may include a multimedia service engine. In some implementations, the means for transmitting the second signal may include means for transmitting a session initiation protocol message. In some implementations, the current session identifier may be included in a header field of the session initiation protocol message. In some implementations, the third signal may be received while the communication session is active. In some implementations, the third signal may be received after the communication session is terminated. Generating a current session identifier may include, when an attribute of the received first signal is associated with an attribute of a previous communication session having a session identifier, generating a current session identifier equal to the session identifier of the previous communication, and, otherwise, generating a current session identifier based at least in part on the received first signal.

A non-transitory computer readable storage medium comprising instructions for transmitting multimedia data for association with a communication session is also provided. The instructions are executable by a processor of an apparatus to cause the apparatus to transmit a first signal to initiate the communication session, receive a session identifier, and transmit a second signal including the multimedia data and the session identifier.

A non-transitory computer readable storage medium comprising instructions for receiving multimedia data for association with a communication session is provided in a further innovative aspect. The instructions are executable by a processor of an apparatus to cause the apparatus to receive a first signal from a device to initiate the communication session, generate a current session identifier for the communication session, transmit a second signal including the current session identifier to the device, receive a third signal including the multimedia data and the current session identifier, and associate the received multimedia data with the communication session associated with the current session identifier.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web-site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device or component included therein as applicable. For example, such a device can be coupled to a server to facilitate the transfer of means for performing the methods described herein. Alternatively, various methods described herein can be provided via storage means (e.g., RAM, ROM, a physical storage medium such as a compact disc, or floppy disk, etc.), such that a device or component included therein can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the disclosure.

While the foregoing is directed to aspects of the present disclosure, other and further aspects of the disclosure may be devised without departing from the basic scope thereof.

What is claimed is:

1. A system for collaborative and distributed emergency multimedia data management comprising:
   a packet data reception interface configured to receive first emergency event packet data and second emergency event packet data, the first emergency event packet data received at a first time, the first time being prior to a second time when the second emergency event packet data is received;
   a rules engine coupled with the packet data reception interface and configured to:
      select a processing profile for the second emergency event packet data using a value included in the second emergency event packet data, said processing profile identifying an event routing plan for the second emergency event packet data, the event routing plan identifying a networked application to receive the second emergency event packet data, and
      associate the second emergency event packet data with the first emergency event packet data based on proximity of a first time or a first location identified in the first emergency event packet data to a second time or a second location identified in second emergency event packet data; and
   a policy engine coupled with the rules engine and configured to execute the processing profile for the second emergency event packet data.

2. The system of claim 1, wherein selecting the processing profile includes:
   comparing the value with one or more values included in a plurality of processing profiles; and
   selecting a processing profile of the plurality of processing profiles based at least in part on the comparison.

3. The system of claim 2, wherein the value is at least one of a header value and a content value included in the second emergency event packet data.

4. The system of claim 3, wherein the value indicates at least one of a packet content type, a packet content length, a packet source, and a packet destination.

5. The system of claim 2, wherein comparing the value comprises generating a comparison value indicating if the value is equal to a stored value included in a processing profile.

6. The system of claim 1, wherein associating the second emergency event packet data with the first emergency event packet data further comprises:
   identifying a second value included in the second emergency event packet data, the second value identifying neither the second time nor the second location;
   comparing the second value with one or more values included in the first emergency event packet data to obtain a comparison result; and
   wherein the associating of the second emergency event packet data with first emergency event packet data is performed when the comparison result indicates a match between at least a portion of the second value included in the second emergency event packet data and at least a portion of the one or more values included in the first emergency event packet data.

7. The system of claim 6, wherein identifying a second value included in the second emergency event packet data comprises identifying at least one of a header value and a content value included in the second emergency event packet data.

8. The system of claim 7, wherein the second value indicates at least one of a packet content type, a packet content length, a packet source, and a packet destination.

9. The system of claim 1, wherein the packet data reception interface is configured to receive geospatial data or temporal data, and at least one of voice data, video data, text message data, email, image data, and audio data for each of the first emergency event packet data and the second emergency event packet data.

10. The system of claim 1, further comprising:
a networked data store coupled with the policy engine; and
an event manager coupled with the policy engine and configured to transmit and receive messages in accordance with the processing profile.

11. A method for collaborative and distributed emergency multimedia event message management among a plurality of agents comprising:
receiving a multimedia message for an emergency event from a source device;
assigning the multimedia message for the emergency event to one or more sessions associated with at least one of the plurality of agents based on proximity of a first time or a first location identified in multimedia messages assigned to the one or more sessions prior to receiving the multimedia message to a second time or a second location identified in the multimedia message for the emergency event;
assigning the one or more sessions into a session group associated with one of the plurality of agents based on a matching profile, said matching profile identifying event characteristics defining the session group; and
assigning the session group to an incident based on an incident match profile, said incident match providing identifying characteristics of sessions and session groups defining the incident.

12. The method of claim 11, wherein assigning the multimedia message for the emergency event further comprises:
identifying a second value included in the multimedia message, the second value identifying neither the second time nor the second location;
comparing the second value with one or more values included in multimedia messages assigned to the one or more sessions to obtain a comparison result; and
wherein the assigning of the multimedia message for the emergency event to a session is performed when the comparison result indicates a match between at least a portion of the second value included in the second emergency event packet data and at least a portion of the one or more values included in the multimedia messages assigned to the session.

13. The method of claim 12, wherein identifying a second value included in the multimedia message comprises identifying at least one of a header value and a content value included in the multimedia message.

14. The method of claim 13, wherein the second value indicates at least one of a packet content type, a packet content length, a packet source, and a packet destination.

15. The method of claim 11, further comprising identifying one of the plurality of agents as a primary agent for the event.

16. A method for collaboration and distribution of emergency multimedia data in a management system, the method comprising:
receiving one or more prior emergency multimedia data elements at a first time and a current emergency multimedia data element at a second time, the first time being prior to the second time;
determining, via a rules engine, an event type of the current emergency multimedia data element based on information included in the current emergency multimedia data element;
selecting a processing profile for the current emergency multimedia data element, the processing profile identifying a first event routing plan for the current emergency multimedia data element, the first event routing plan identifying an application to receive and process the current emergency multimedia data element;
identifying at least one of the one or more prior emergency multimedia data elements based at least in part on proximity of a first time or a first location identified in one or more prior emergency multimedia data elements to a second time or a second location identified in the current multimedia data element; and
storing an association of the at least one of the one or more prior emergency multimedia data elements search result with the current emergency multimedia data element.

17. The method of claim 16, wherein determining the event type comprises identifying at least one of a header value and a content value of the current emergency multimedia data element.

18. The method of claim 16, wherein providing the selecting profile includes:
identifying a value included in the current emergency multimedia data element;
comparing the identified value with one or more values included in a plurality of processing profiles; and
selecting a processing profile of the plurality of processing profiles based at least in part on the comparison.

19. The method of claim 18, wherein identifying a value included in the current emergency multimedia data element comprises identifying at least one of a header value and a content value.

20. The method of claim 19, wherein the identified value indicates at least one of a packet content type, a packet content length, a packet source, and a packet destination.

21. The method of claim 18, wherein comparing the identified value comprises generating a comparison value indicating if the identified value is equal to a stored value included in a processing profile.

22. The method of claim 16, wherein the current emergency multimedia data element and the one or more prior emergency multimedia data elements each include geospatial data or temporal data, and at least one of voice data, video data, text message data, email, image data, and audio data.

23. A non-transitory computer readable storage medium including instructions for collaboration and distribution of emergency multimedia data in a management system, the instructions executable by a processor of an apparatus, the instructions causing the apparatus to:
receive one or more prior emergency multimedia data elements at a first time and a current emergency multimedia data element at a second time, the first time being prior to the second time;
determine an event type of the current emergency multimedia data element based on information included in the current emergency multimedia data element;
provide a processing profile for the current emergency multimedia data element, the processing profile identifying a first distribution plan for the current emergency multimedia data element, the first distribution plan identifying an application to receive and process the emergency event packet data;
identify at least one of the one or more prior emergency multimedia data elements based at least in part on proximity of a first time or a first location identified in one or more prior emergency multimedia data elements to a second time or a second location identified in the current multimedia data element; and
store an association of the at least one of the one or more prior emergency multimedia data elements with the current emergency multimedia data element.

24. A non-transitory computer readable storage medium including instructions for collaborative and distributed emergency multimedia event message management among a plurality of agents, the instructions executable by a processor of an apparatus, the instructions causing the apparatus to:
- receive a multimedia message for an emergency event from a source device;
- assign the multimedia message for the emergency event to one or more sessions associated with at least one of the plurality of agents based on proximity of a first time or a first location identified in multimedia messages assigned to the one or more sessions prior to receiving the multimedia message to a second time or a second location identified in the multimedia message for the emergency event;
- assign the one or more sessions into a session group associated with one of the plurality of agents based on a matching profile, said matching profile identifying event characteristics defining the session group; and
- assign the session group to an incident based on an incident match profile, said incident match provide identifying characteristics of sessions and session groups defining the incident.

* * * * *

UNITED STATES PATENT AND TRADEMARK OFFICE
CERTIFICATE OF CORRECTION

| | | Page 1 of 1 |
|---|---|---|
| PATENT NO. | : 9,137,383 B2 | |
| APPLICATION NO. | : 13/526305 | |
| DATED | : September 15, 2015 | |
| INVENTOR(S) | : Lorenzo Javier Estrada | |

It is certified that error appears in the above-identified patent and that said Letters Patent is hereby corrected as shown below:

Title Page

In column 1 (page 3, item 56) at line 39, Under Other Publications, change "Its" to --It's--.

In column 2 (page 4, item 56) at line 7, Under Other Publications, change "VolP" to --VoIP--.

In the Claims

In column 34 at line 8, In Claim 16, after "elements" delete "search result".

Signed and Sealed this
Third Day of May, 2016

Michelle K. Lee
*Director of the United States Patent and Trademark Office*